(12) United States Patent
Tanimoto et al.

(10) Patent No.: US 6,411,321 B2
(45) Date of Patent: *Jun. 25, 2002

(54) LIGHT BEAM SCANNING APPARATUS AND IMAGE FORMING APPARATUS

(75) Inventors: Koji Tanimoto; Kenichi Komiya, both of Kawasaki; Naoaki Ide, Shizuoka; Jun Sakakibara, Tokyo, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,705

(22) Filed: Sep. 10, 1998

(30) Foreign Application Priority Data

Sep. 10, 1997 (JP) ............................... 9-245319
Sep. 22, 1997 (JP) ............................... 9-257351

(51) Int. Cl.[7] ................................................. B41J 2/435
(52) U.S. Cl. ....................................... 347/235; 347/236
(58) Field of Search ............................... 347/233, 236, 347/237, 246, 247, 235, 234; 359/204; 250/208.1, 208.2, 208.3, 578.1, 235

(56) References Cited

U.S. PATENT DOCUMENTS

| | | | | |
|---|---|---|---|---|
| 5,006,705 A | * | 4/1991 | Saito et al. | 347/243 |
| 5,750,986 A | * | 5/1998 | Genovese | 250/235 |
| 5,844,591 A | * | 12/1998 | Takamatsu et al. | 347/235 |
| 5,883,385 A | * | 3/1999 | Takahashi et al. | 250/235 |
| 5,883,731 A | * | 3/1999 | Kasai | 359/204 |
| 5,892,533 A | | 4/1999 | Tanimoto et al. | 347/257 |
| 5,912,694 A | * | 6/1999 | Miyake et al. | 347/247 |
| 5,926,203 A | * | 7/1999 | Shimura et al. | 347/235 |
| 5,929,897 A | | 7/1999 | Schneider | 348/14.08 |
| 5,995,246 A | | 11/1999 | Komiya et al. | 358/481 |
| 6,243,123 B1 | | 6/2001 | Tanimoto et al. | 347/235 |

FOREIGN PATENT DOCUMENTS

| | | | | |
|---|---|---|---|---|
| EP | 0 529 531 A2 | 3/1993 | | |
| EP | 0 710 005 A2 | 5/1996 | | |
| EP | 0 812 101 A2 | 12/1997 | | |
| JP | 3-57452 | 9/1991 | | |
| JP | 9-4743527 | * 2/1997 | ............... | B41J/2/44 |

\* cited by examiner

Primary Examiner—Hai Pham
(74) Attorney, Agent, or Firm—Foley & Lardner

(57) ABSTRACT

In a digital copying machine using a multi-beam optical system, a sensor pattern SH for sensing the power of each of the light beams a to d scanning the surface of a photosensitive drum and sensor patterns SB1 to SF1, SB2 to SF2 for sensing the passing positions of the beams are provided in a light beam position sensing unit. The sensor patterns SB1 to SF1, SB2 to SF2 are arranged linearly in the sub-scanning direction at intervals corresponding to two resolutions. The power of each light beam on the surface to be scanned is controlled so as to be in a specific range. Even when the light beams are scanned with different resolutions, they can be controlled with high accuracy so as to constantly have an ideal positional relationship between them. This always assures high picture quality.

16 Claims, 18 Drawing Sheets

LIGHT BEAM SCANNING APPARATUS AND IMAGE FORMING APPARATUS

BACKGROUND OF THE INVENTION

This invention relates to a light beam scanning apparatus for scanning and exposing a single photo-sensitive drum simultaneously with laser beams to form an electrostatic latent image on the drum and to an image forming apparatus, such as a digital copying machine or a laser printer, using the light beam scanning apparatus.

In recent years, digital copying machines have been developed which form images by laser-beam scanning and exposure and electronic photographic processing.

To step up the image forming speed, a multi-beam digital copying machine has also been developed. In this type of copying machine, multiple laser beams are generated and caused to make simultaneous scanning in units of more than one line.

The multi-beam digital copying machine includes an optical beam scanning apparatus. The optical beam scanning apparatus comprises semiconductor laser oscillators for generating laser beams, a multiplanar rotating mirror, such as a polygon mirror, for reflecting the laser beams from the laser oscillators toward the photosensitive drum and causing each laser beam to scan the drum, and an optical unit mainly composed of a collimator lens and an f-θ lens.

With the configuration of the conventional optical system unit, however, it is very difficult to ideally adjust the positional relationship between the light beams on the photosensitive drum (a surface to be scanned). Realizing this requires very high accuracy of component parts and assembly, which results in a rise in the manufacturing cost of the apparatus.

Even if the apparatus has been assembled in the ideal positional relationship, environmental changes, including temperature changes and humidity changes, slight changes in the shape of the lens with time, or slight changes in the positional relationship between the component parts will ruin the positional relationship between the light beams, making it impossible to form a high-quality image. Therefore, to realize the ideal optical system needs a configuration and components parts immune to those changes.

The conditions for obtaining a high-quality image by use of the multi-beam optical system are as follows:

(1) The optical power of each beam on the photosensitive drum has to be the same.
(2) The light beams have to have a specific positional relationship (the passing positions of the light beams have to have a specific positional relationship in the sub-scanning direction).
(3) The exposure timing to form an image in the main scanning direction has to be controlled according to the positional relationship between the light beams.

Of these conditions, to fulfill condition (1) is the most important. The reason is that if the optical power is not the same on the photosensitive drum, the positions will not be adjusted correctly in a true sense even when condition (2) and condition (3) appear to have been fulfilled correctly. Namely, the accuracy of control in condition (2) and condition (3) depends on the power of each light beam.

Therefore, each light beam scanning the photo-sensitive drum, that is, each light beam emitted from each of the laser oscillators, has to have the same power after it has been combined with another by means of optical means, such as a half mirror.

BRIEF SUMMARY OF THE INVENTION

An object of the present invention is to provide a light beam scanning apparatus capable of controlling the power of a light beam at a surface to be scanned to a desired value, constantly controlling the passing position of the light beam on the surface and the exposure timing suitably with high accuracy, and therefore, always assuring high picture quality, and an image forming apparatus using the optical beam scanning apparatus.

Another object of the present invention is to provide a light beam scanning apparatus capable of controlling the power of each light beam at a surface to be scanned to a desired value in using more than one light beam, constantly controlling the passing position of each light beam to the ideal position and the exposure timing of each light beam with high accuracy even when the positional relationship between light beam on the surface is caused to correspond to more than one resolution, and therefore always assuring high picture quality, and an image forming apparatus using the light beam scanning apparatus.

In order to achieve to the above objects, according to one aspect of the present invention, there is provided a light beam scanning apparatus comprising: a plural light beam generating means for generating a light beam; plural optical means, provided to each of the plural light beam generating means respectively, for combining the plural light beams; single scanning means for reflecting the light beams combined by the combining means toward a surface to be scanned and causing the light beams to scan the surface in a main scanning direction; light beam power sensing means for using a first light-receiving element to sense the power of each of the light beams caused by the scanning means to scan the surface; and light beam power control means for controlling each of the plural light beam generating means on the basis of the result of sensing at the light beam power sensing means so that the difference between the power of one of the light beams scanning the surface and the power of each of the remaining three may be equal to or less than a specific value.

With the scanning apparatus that uses light beams to scan the photosensitive drum, the power of each light beam on the surface to be scanned or the surface of the photosensitive drum is controlled to a desired value.

A sync clock is generated after a delay from when each light beam moves across a light beam detector. The spacing between each light receiving element is set to an integral multiple of the length of one dot formed by a light beam on the photosensitive drum in the main scanning direction. In synchronism with the synch clocks, pixel clocks and image data are applied to laser oscillators to form an image on the surface of the photosensitive drum. The synch clock generating operation are performed after the light beams are controlled to have substantially the same power.

According to another aspect of the present invention, there is provided a light beam scanning apparatus comprising: plural light beam generating means for each generating light beams; scanning means for reflecting the light beams generated at the plural light beam generating means toward a surface to be scanned and causing the light beams to scan the surface in the main scanning direction; first light beam position sensing means for using light-receiving elements arranged linearly at intervals corresponding to a first resolution in the sub-scanning direction perpendicular to the main scanning direction to sense the light beams caused by the scanning means to scan the surface; second light beam position sensing means for using light-receiving elements arranged linearly at intervals corresponding to a second resolution differing from the first resolution in the sub-scanning direction to sense the light beams caused by the scanning means to scan the surface; and light beam passing position control means for controlling the light beams caused to scan by the scanning means on the basis of the results of sensing at the first and second light beam position sensing means so that each of the passing positions of the light beams on the surface may become a proper position according to the first or second resolution.

With the scanning apparatus that uses light beams to scan the surface to be scanned, even when more than one resolution is used, the light beams on the surface to be scanned are constantly controlled with high accuracy so as to have an ideal positional relationship between them.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Hereinafter, referring to the accompanying drawings, an embodiment of the present invention will be explained.

Figure 1:
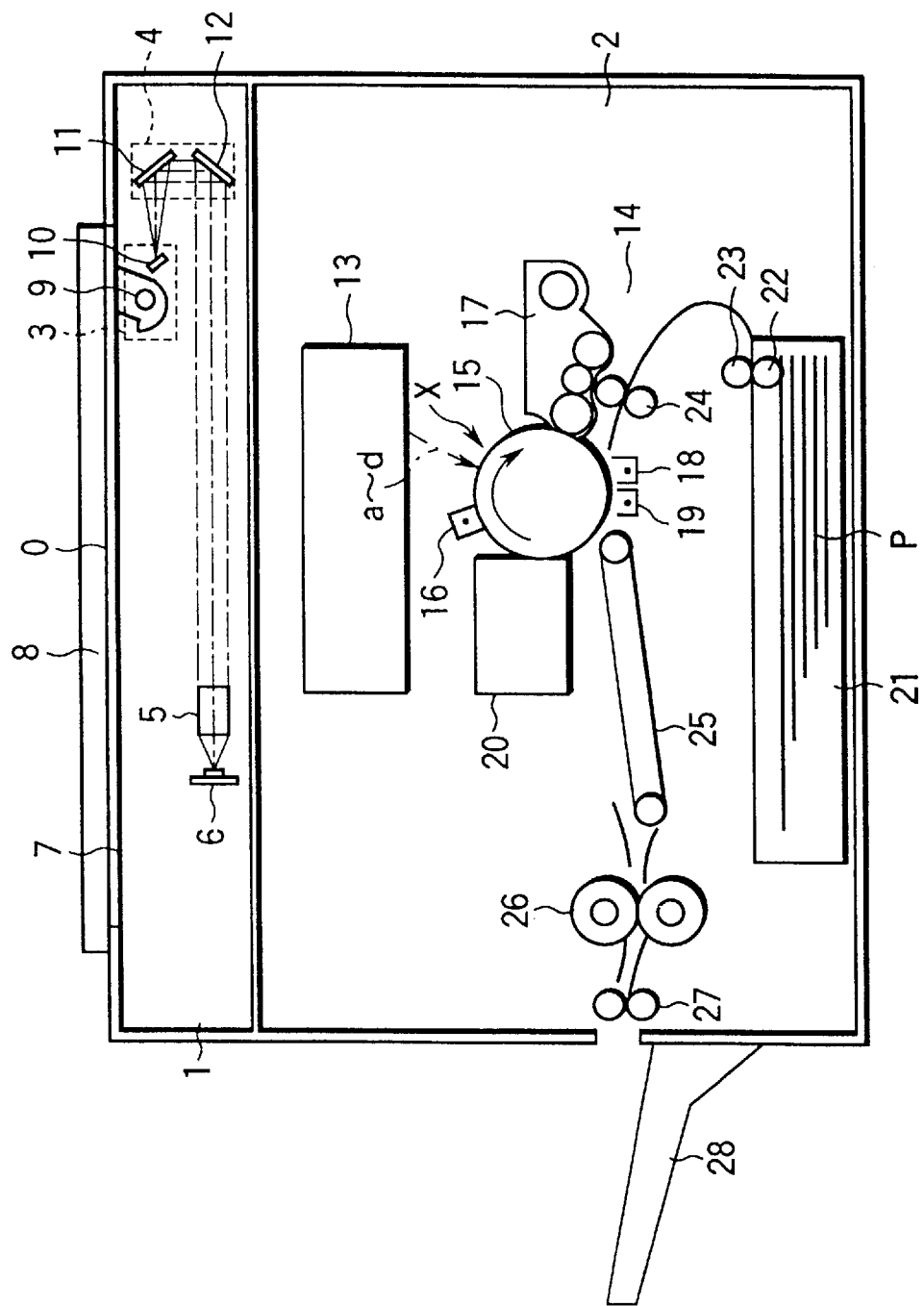
FIG. 1 shows a schematic configuration of a digital copying machine according to an embodiment of the present invention.

FIG. 1 shows the configuration of a digital copying machine, which is an image forming apparatus including a light beam scanning apparatus according to an embodiment of the present invention. The digital copying machine includes a scanner unit 1 acting as image reading means and a printer unit 2 acting as image forming means. The scanner unit 1 is composed of a first carriage and a second carriage which are movable in the direction of the arrow, an image formation lens 5, and a photoelectric conversion element 6.

In FIG. 1, a document O is placed on an document table 7 made of transparent glass, with the printed side downward. The placement reference of the document is at the right end in the middle of the lateral side of the document table 7. A document holding cover 8 that can be opened and closed presses the document O against the document table 7.

A light source 9 illuminates the document O. The reflected light from the document passes through mirrors 10, 11, 12 and an image formation lens 5 and is gathered on the light-receiving surface of a photo-electric conversion element. The first carriage 3 on which the light source 9 and mirror 10 are mounted and the second carriage 4 on which the mirrors 11, 12 are mounted move at a relative speed in the ratio of 2:1. A carriage driving motor (not shown) moves the first carriage 3 and second carriage 4 from right to left in synchronization with a read timing signal.

In this way, the image of the document O on the document table 7 is read line by line by the scanner unit 1. The output of the scanner unit 1 is converted by an image processing unit (not shown) into an 8-bit digital signal indicating the gradation of image.

The printer unit 2 is composed of an optical system unit 13 and an image forming unit 14 using an electronic photographic system capable of forming an image on a sheet of paper P serving as a medium on which an image is to be formed. Specifically, the image signal read from the document 0 by the scanner unit 1 is processed at the image processing unit (not shown) and then converted into laser beams (hereinafter, referred to as light beams) from semiconductor laser oscillators. The optical system of the embodiment uses a multi-beam optical system using more than one semiconductor laser oscillator.

The configuration of the optical system unit 13 will be explained in detail later. The semiconductor laser oscillators provided in the unit emit light according to the laser modulation signal outputted from the image processing unit (not shown). The light beams from the semiconductor laser oscillators are reflected by a polygon mirror and outputted to the outside of the unit in the form of scanning light.

The light beams from the optical system unit 13 form a spot with the necessary resolution at point X, the exposure position on a photosensitive drum 15 serving as an image retaining member. They scan the photosensitive drum 15 in the main scanning direction (hereinafter, referred to as the direction of scanning). This makes an electrostatic latent image corresponding to the image signal on the photosensitive drum 15.

Around the photosensitive drum 15, there are provided an electrifying charger 16 for electrifying the surface of the drum, a developing unit 17, a transfer charger 18, a peeling charger 19, and a cleaner 20. The photosensitive drum 15 is rotated by a driving motor (not shown) at a specific circumferential speed. It is electrified by the electrifying charger 16 facing the surface of the drum. More than one light beam (or scanning light beam) forms a spot at point X, the exposure position on the electrified photosensitive drum 15.

The electrostatic latent image formed on the photosensitive drum 15 is developed with the toner (or developer) from the developing unit 17. The toner image formed on the photosensitive drum 15 is transferred onto the sheet P fed with a suitable timing by the paper feed system.

In the paper feed system, sheets of paper P in a paper feed cassette 21 are taken out one by one by a supply roller 22 and a separation roller 23. The sheet P is sent to a resist roller 24, which carries the sheet to the transfer position with a specific timing. In the downstream side of the transfer charger 18, there are provided a sheet transport mechanism 25, a fixing unit 26, and delivery rollers 27 for discharging the sheet P on which an image has been formed. With this arrangement, the fixing unit 26 fixes the toner image on the sheet on which the toner image has been transferred. Thereafter, the sheet is discharged via the delivery rollers 27 into a delivered sheet tray 28 outside.

After the image has been transferred from the photosensitive drum 15 to the sheet P, the remaining toner on the surface of the drum is removed by the cleaner 20, which returns the drum to the initial state. In this state, the drum is waiting to form the next image.

The repetition of the aforementioned processes causes the operation of forming images to be performed continuously.

As described above, the document O on the document table 7 is read at the scanner unit 1. The read data is subjected to a series of processes and then recorded on the sheep P in the form of a toner image.

Explanation of the optical system unit 13 will be given.

Figure 2:
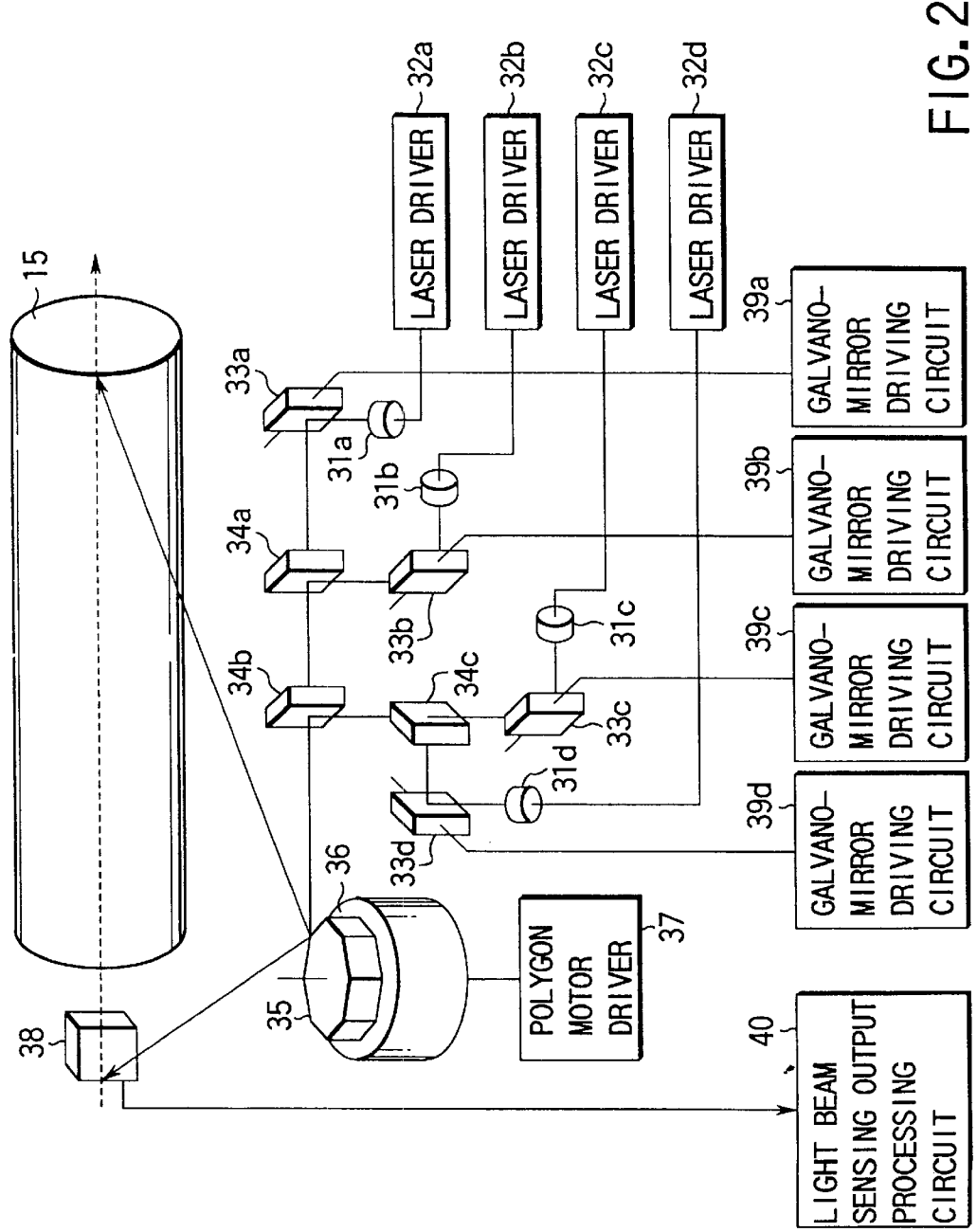
FIG. 2 shows the configuration of the optical system unit and the location of the photosensitive drum.

FIG. 2 shows the configuration of the optical system unit 13 and the location of the photosensitive drum 15. The optical system unit 13 includes, for example, semiconductor laser oscillators 31a, 31b, 31c, 31d, serving as four light beam generating means. The semiconductor laser oscillators 31a, 31b, 31c, 31d scan the photosensitive drum 15 simultaneously, enabling an image to be formed at high speed without increasing the number of revolutions of the polygon mirror.

Specifically, the laser oscillator 31a is driven by a laser driver 32a. The light beam outputted passes through a collimator lens (not shown) and strikes a galvanomirror 33a serving as optical path changing means. The light beam reflected from the galvanomirror 33a passes through a half mirror 34a and a half mirror 34b and strikes a polygon mirror 35 acting as a multiplanar rotation mirror.

The polygon mirror 35 is rotated at a constant speed by a polygon motor 36 driven by a polygon motor driver 37. This causes the reflected light from the polygon mirror 35 to scan in a constant direction at an angular velocity determined by the number of revolutions of the polygon motor 36. The light beam moved to and fro by the polygon mirror 35 passes through an f-θ lens (not shown). The f-θ characteristic of the lens enables the light beam to scan the light-receiving surface of a light beam sensing unit 38 and the surface of the photosensitive drum 15 at a constant speed. The beam sensing unit 38 serves as light beam position sensing means, light beam passing timing sensing means, and light-beam power sensing means.

The laser oscillator 31b is driven by a laser driver 32b. The light beam outputted passes through a collimator lens (not shown) and is reflected by a galvanomirror 33b and then by the half mirror 34a. The reflected light from the half mirror 34a passes through the half mirror 34b and strikes the polygon mirror 35. The optical path through which the beam travels after the polygon mirror 35 is the same as that for the laser oscillator 31a. Namely, the light beam passes through the f-θ lens (not shown) and scans the light-receiving surface of the light beam sensing unit 38 and the surface of the photosensitive drum 15 at a constant speed.

The laser oscillator 31c is driven by a laser driver 32c. The light beam outputted passes through a collimator lens (not shown) and is reflected by a galvanomirror 33c. The reflected light passes through a half mirror 34c, is reflected by the half mirror 34b, and strikes the polygon mirror 35. The optical path through which the beam travels after the polygon mirror 35 is the same as that for the laser oscillator 31a or 31b. Namely, the light beam passes through the f-θ lens (not shown) and scans the light-receiving surface of the light beam sensing unit 38 and the surface of the photosensitive drum 15 at a constant speed.

The laser oscillator 31d is driven by a laser driver 32d. The light beam outputted passes through a collimator lens (not shown) and is reflected by a galvanomirror 33d. The reflected light is further reflected by the half mirror 34c and then by the half mirror 34b, and strikes the polygon mirror 35. The optical path through which the beam travels after the polygon mirror 35 is the same as that for the laser oscillator 31a, 31b, or 31c. Namely, the light beam passes through the f-θ lens (not shown) and scans the light-receiving surface of the light beam sensing unit 38 and the surface of the photosensitive drum 15 at a constant speed.

Each of the laser drivers 32a to 32d includes an automatic power control (APC) circuit. This causes the laser oscillators 31a to 31d respectively to emit light constantly at the light-emitting power level set by a main control unit (CPU) 51, which will be explained later.

The light beams from the separate laser oscillators 31a, 31b, 31c, 31d are combined at the half mirrors 34a, 34b, 34c to form four light beams, which travel toward the polygon mirror 35.

This enables the four light beams to scan the photosensitive drum 15 simultaneously. As a result, if the number of revolutions of the polygon mirror 35 is the same, use of the four light beams will enable an image to be recorded at a speed four times as fast as that achieved by use of a single light beam in the prior art.

The galvanomirrors 33a, 33b, 33c, 33d are for adjusting (or controlling) the positional relationship between the light beams in the sub-scanning direction (or in the direction perpendicular to the main scanning direction). Galvanomirror driving circuits 39a, 39b, 39c, 39d are connected to the galvanomirrors 33a, 33b, 33c, 33d respectively.

The light beam sensing unit 38 is for sensing the passing position, passing timing, and power of each of the four light beams. It is provided near one end of the photosensitive drum 15 in such a manner that the light-receiving surface of the unit 38 makes an extension of the surface of the photosensitive drum 15. Control of the galvanomirrors 33a, 33b, 33c, 33d corresponding to the respective light beams (or image formation position control in the sub-scanning direction), control of the light-emitting power (or intensity) of the laser oscillators 31a, 31b, 31c, 31d, and control of the light emitting timing (or image formation position control in the main scanning direction) are performed on the basis of the sense signal from the light beam sensing unit 38. A light beam sensing processing circuit 40 is connected to the light beam sensing unit 38 to generate the signals for performing the above controls.

Explanation of the light beam sensing unit 38 will be given.

Figure 3:
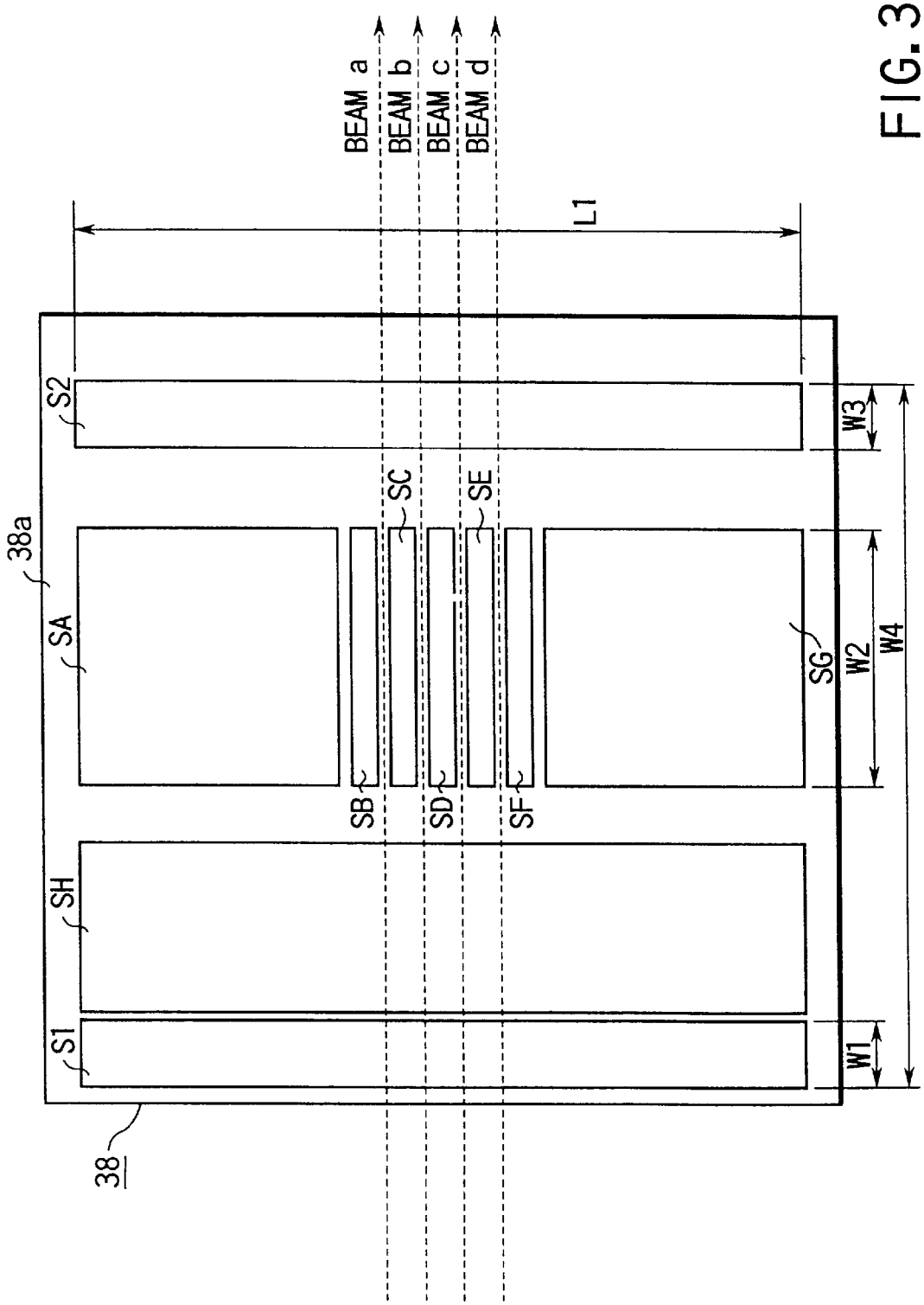
FIG. 3 shows a schematic configuration of the light beam sensing device.

FIG. 3 pictorially shows how the structure of the light beam sensing unit 38 is related to the direction in which the light beams scan. The four light beams a to d from the four semiconductor laser oscillators 31a, 31b, 31c, 31d scan the surface to be scanned as the polygon mirror 35 rotates, traversing over the light beam sensing unit 38 from left to right.

The light beam sensing unit 38 comprises two oblong sensor patterns S1, S2 acting as a first light sensing section, seven sensor patterns SA, SB, SC, SD, SE, SF, SG sandwiched between the two sensor patterns S1, S2 and serving as a second and a third light sensing section, a sensor pattern SH provided next to the sensor pattern S1 (or immediately to the right of the sensor pattern S1) and acting as a fourth light sensing section, and a holding substrate 38a for integrally holding the sensor patterns S1, S2, SA, SB, SC, SD, SE, SF, SG, SH. The sensor patterns S1, S2, SA to SG, SH are composed of, for example, photodiodes.

The sensor pattern S1 is a pattern that senses the passing of a light beam and generates a reset signal (or an integration start signal) for an integrator explained later. The sensor pattern S2 is a pattern that senses the passing of a light beam and generates a conversion start signal for an A/D converter explained later. Each of the sensor patterns SA to SG is a pattern that senses the passing of a light beam. The sensor pattern SH is a pattern for sensing the power of a light beam.

As shown in FIG. 3, the sensor patterns S1, S2 are formed oblong in the sub-scanning direction so that the light beams a to d deflected by the polygon mirror 35 never fail to traverse them, regardless of the positions of the galvanomirrors 33a to 33d. For example, in the embodiment, the width W1 of the pattern S1 and the width W3 of the pattern in the main scanning direction are 200 μm, whereas the length L1 of them in the sub-scanning direction is 2000 μm.

The sensor patterns SA to SG are arranged in such a manner that they are stacked one on top of another in the sub-scanning direction between the sensor patterns S1 and S2 as shown in FIG. 3. The length along which they are arranged is L1, the same length as that of the sensor patterns S1, S2. The width W2 of each of the sensor patterns SA to SG is, for example, 600 μm.

As seen from the figure, the sensor pattern SH has a length of L1, the same length as that of the sensor patterns S1, S2, and is of a sufficiently large size. When a light beam crosses the light beam sensing unit 38, it never fails to cross over the sensor pattern SH.

Figure 4:
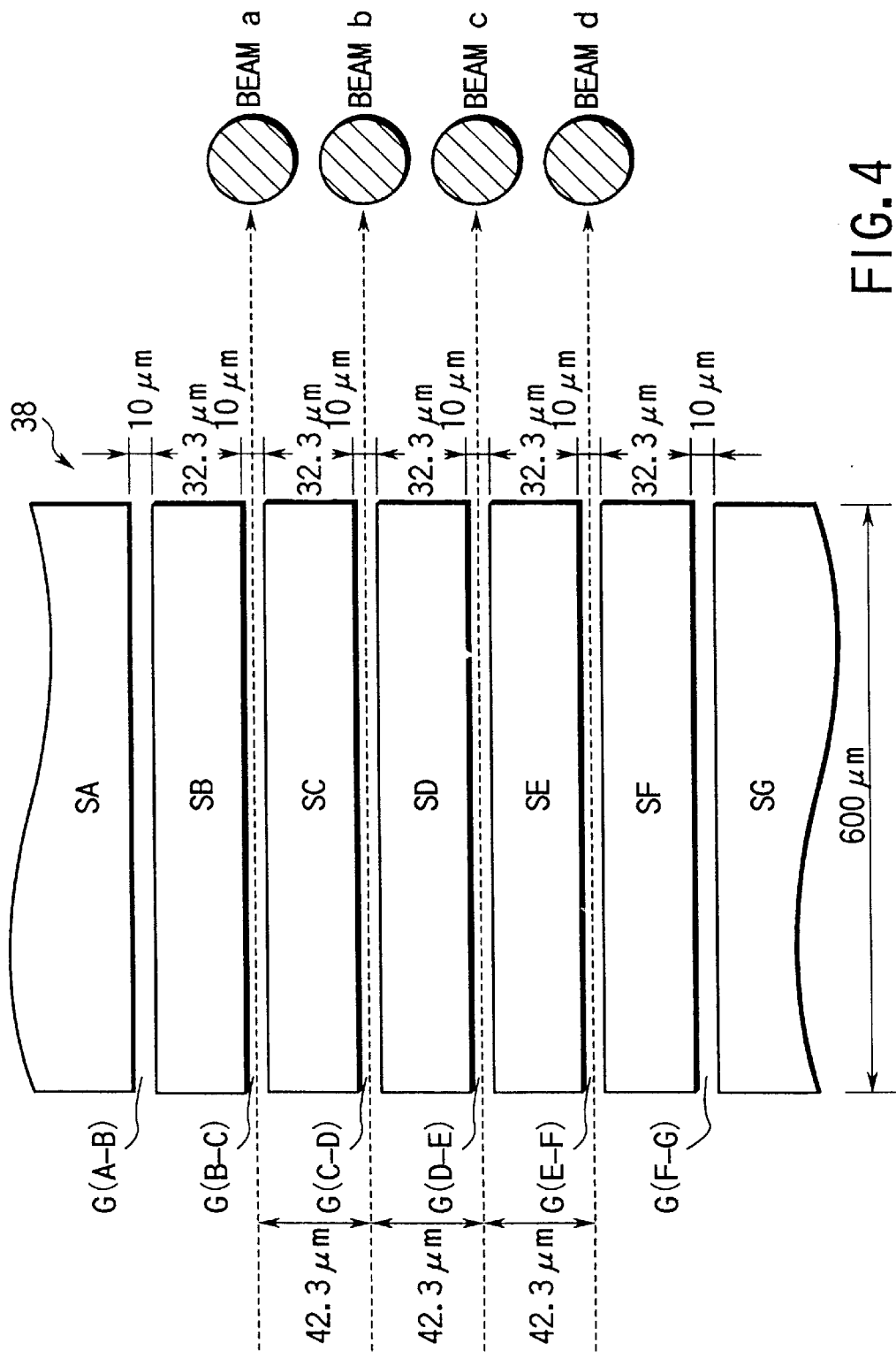
FIG. 4 schematically shows the structure of the important portion of the light beam sensing device in FIG. 3.

FIG. 4 is an enlarged view of the shape of the sensor patterns SA to SG in the light beam sensing unit 38.

Each of the sensor patterns SB to SF takes the form of a rectangle of, for example, 32.3 μm×600 μm. A very small gap G of about 10 μm is made between them in the sub-scanning direction. Accordingly, the pitch between the gaps is 42.3 μm. The gap between the sensor patterns SA and SB and that between the sensor patterns SF and SG are also set to about 10 μm. The width of the sensor patterns SA, SG is made greater than that of the sensor patterns SB to SF.

The details of control using the output of the light beam sensing unit 38 constructed as described above will be explained later. The gaps made at a pitch of 42.3 μm function as a target to control the passing position of each of the light beams a, b, c, and d so that they may be spaced at specific intervals (42.3 μm in the embodiment). Specifically, the gap G (B-C) made by the sensor patterns SB and SC serves as the target for the passing position of the light beam a; the gap G (C-D) made by the sensor patterns SC and SD serves as the target for the passing position of the light beam b; the gap G (D-E) made by the sensor patterns SD and first resolution in the sub-scanning direction, to sense positions through which the light beams caused by said scanning unit to be scanned over the surface pass in the sub-scanning direction, and wherein said light beam passing position controller controls each of the light beams caused by said scanning unit to be scanned over the surface on a basis of an associated one of results of sensing by said first and second light beam position sensors, so that said each of the light beams passes through a proper position in accordance with an associated one of the first and second resolution.

Explanation of the control system will be given.

Figure 5:
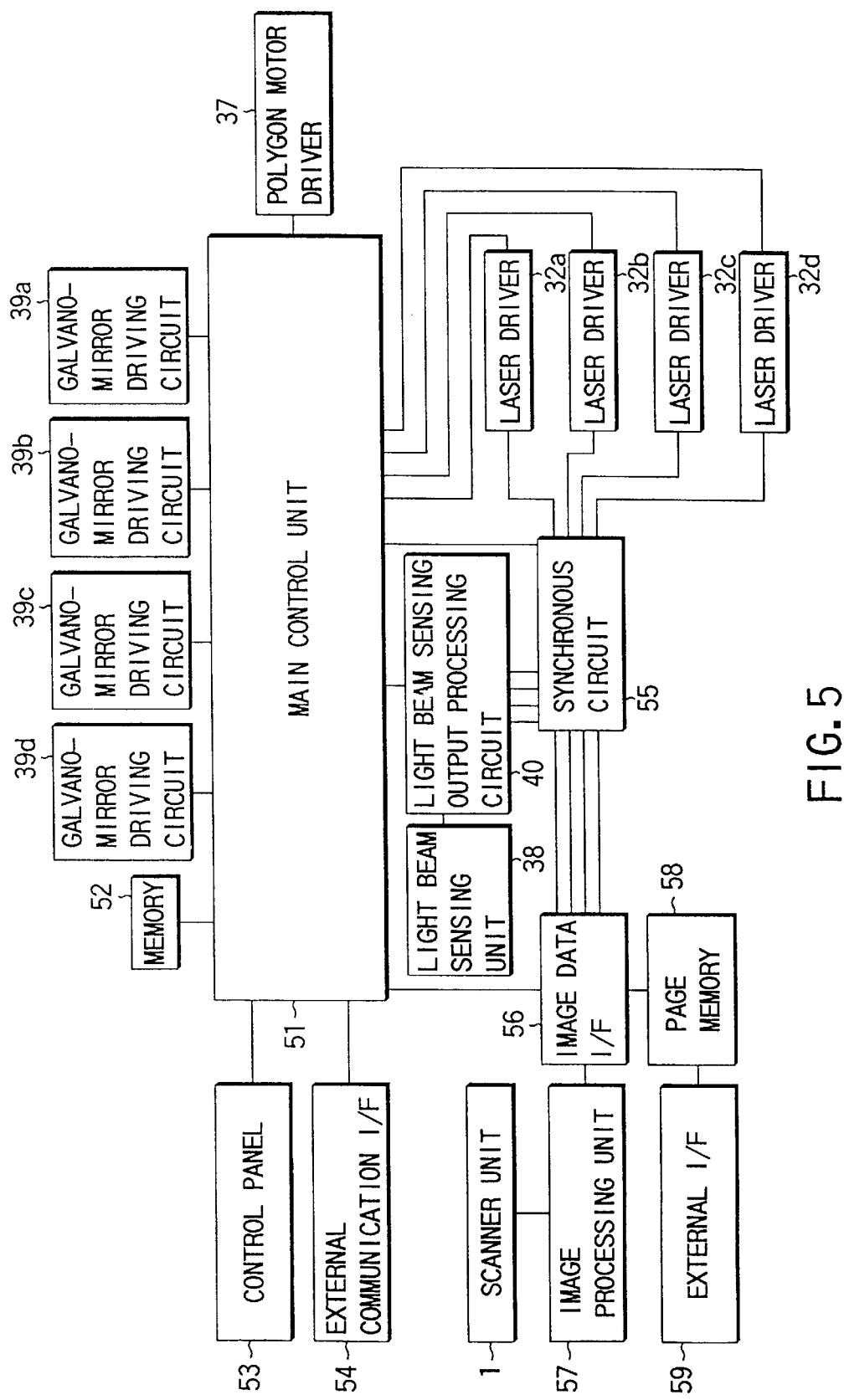
FIG. 5 is a block diagram of the control system for mainly controlling the optical system.

FIG. 5 shows the control system for mainly controlling the multi-beam optical system. Numeral 51 indicates a main control unit 51 which is composed of, for example, a CPU, and supervises the overall control. Connected to the main control unit 51 are a memory 52, a control panel 53, an external interface (I/F) 54, the laser drivers 32a, 32b, 32c, 32d, the polygon mirror motor driver 37, the galvanomirror driving circuits 39a, 39b, 39c, 39d, the light beam sensing output processing circuit 40, a synchronous circuit 55, and an image data interface (I/F) 56.

The image data I/F 56 is connected to the synchronous circuit 55. An image processing unit 57 and a page memory 58 are connected to the image data I/F 56. The scanner unit 1 is connected to the image processing unit 57. An external interface (I/F) 59 is connected to the page memory 58.

The flow of image data in forming an image will be explained briefly.

As explained earlier, in a copying operation, the image on the document O set on the document table 7 is read by the scanner unit 1 and the read signal is sent to the image processing unit 57. The image processing unit 57 subjects the image signal from the scanner unit 1 to known shading correction, various filtering processes, gray level processing, and gamma correction.

The image data from the image processing unit 57 is sent to the image data I/F 56. The image data I/F 56 distributes the image data to the four laser drivers 32a, 32b, 32c, and 32d.

The synchronous circuit 55 generates a clock synchronizing with the timing with which each light beam passes over the light beam sensing unit 38 and sends the image data from the image data I/F 56 to the laser drivers 32a, 32b, 32c, and 32d as a laser modulation signal in synchronization with the clock.

Transferring the image data in synchronization with the scanning of each light beam enables an image to be formed (in the proper position) synchronously in the main scanning direction.

The synchronous circuit 55 includes a sample timer and a logic circuit. The sample timer operates the APC circuit to control the power of each light beam and forces the laser oscillators 31a, 32b, 31c, 31d to emit light in non-image areas. The logic circuit causes the laser oscillators 31a, 32b, 31c, 31d for the respective light beams to emit light independently to adjust the light emitting timing (or image formation start point) of each light beam.

Here, the effect of variations in the power of a light beam on the accuracy of image formation in the main scanning direction will be explained.

In the embodiment, the light-emitting timing (or the image formation start point) for each laser oscillator to form an image is controlled on the basis of the timing with which each light beam passes over the sensor pattern S1 or S2. Specifically, in FIG. 5, the output of the sensor pattern S1 or S2 of the light beam sensing unit 38 is waveform-shaped at the light beam sensing output processing circuit 40. The shaped signal is supplied to the synchronous circuit 55 as a synchronous signal in the main scanning direction. On the basis of the synchronous signal, the image data is sent to the respective laser drivers 32a to 32d with the passing timing of each light beam, thereby forming the proper image.

When an image is formed using the multi-beam copying machine, the light-emitting timing for each light beam must be controlled with high accuracy to align the image formation positions for the individual light beams in the main scanning direction. Control of the light emitting timing has been disclosed in detail in U.S. patent application Ser. No. 08/867,655, filed by Komiya, et al., page 28 line 14 to page 66 line 13 and FIGS. 5 to 28B. Explanation of the control will not be given here.

Figure 6:
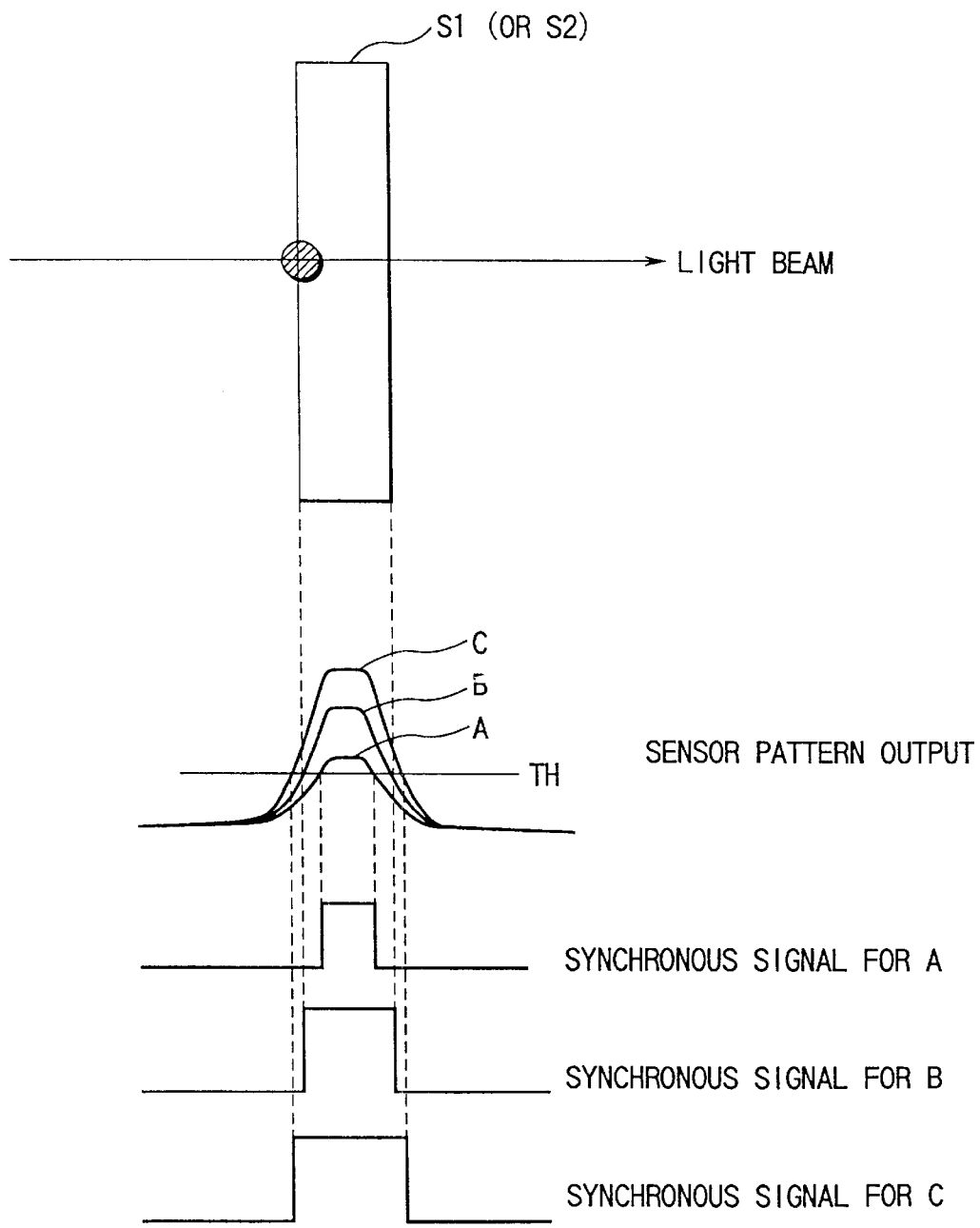
FIG. 6 is a diagram to help explain the dependence of the accuracy of image formation in the main scanning direction on the power of a light beam.

FIG. 6 is a diagram to help explain the dependence of the accuracy of image formation in the main scanning direction on the power of a light beam. FIG. 6 shows sensor pattern outputs and synchronous signals generated by waveform-shaping the outputs in a case where the power of a light beam varies in three stages (A, B, and C). The sensor pattern output (analog signal) A is obtained when the power of the light beam is low and has the lowest peak among the three outputs. The binarization (or waveform shaping) of the sensor pattern output A with a threshold level TH in the figure produces a small pulse signal (or synchronous signal for A).

In contrast, the sensor pattern output C is obtained when the power of the light beam is high and has the highest peak among the three outputs. The binarization of the sensor pattern output C with the threshold level TH in the figure produces the largest pulse signal (or synchronous signal for C).

The sensor pattern output B and its synchronous signal are obtained when the power of the light beam lies between those of the sensor pattern outputs A and C.

When the laser light-emitting timing for image formation is controlled on the basis of, for example, the edges (or the rising or falling) of the three synchronous signals A, B, and C, the images shift in the main scanning direction on the lines for which the light beams differ in power. This is because the phases of the edges of the synchronous signals disagree with each other as shown in FIG. 6.

As explained above, to form an image with no shift in the main scanning direction by means of the multi-beam optical system, the individual light beams with the same power must scan the sensor patterns (or the photosensitive drum) for generating synchronous signals.

In FIG. 5, the control panel 53 is a man-machine interface for starting a copying operation or setting the number of sheets of paper.

The digital copying machine of the embodiment can not only make copies but also form images from the image data externally supplied via the external I/F 59 connected to the page memory 58. The image data supplied from the external I/F 59 is temporarily stored in the page memory 58 and then sent to the synchronous circuit 55 via the image data I/F 56.

When the digital copying machine is externally controlled via a network, the external communication I/f 54 serves as the control panel 53.

The galvanomirror driving circuits 39a, 39b, 39c, and 39d are circuits for driving the galvanomirrors 33a, 33b, 33d, and 33d according to the specified values from the main control unit 51. Therefore, the main control unit 51 can control the angles of the galvanomirrors 33a, 33b, 33d, and 33d freely via the galvanomirror driving circuits 39a, 39b, 39c, and 39d.

The polygon motor driver 37 is a driver for driving the polygon motor 36 for rotating the polygon mirror 35 that defects the four light beams. The main control unit 51 instructs the polygon motor driver 37 to start and stop rotation of change the number of revolutions. Changing the number of revolutions is effected when the number of revolutions is made smaller than a specific number of revolutions as the need arises, in determining the passing position of a light beam with the light beam sensing unit 38.

The laser drivers 32a, 32b, 32c, 32d not only emit laser light according to the laser modulation signal (image signal) from the image processing unit but also forces the laser oscillators 31a, 31b, 31c, 31d to emit light according to the forced light-emitting signal from the main control unit 51, regardless of the image data.

The main control unit 51 sets the power produced by each of the laser oscillators 31a, 31b, 31c, 31d in the respective laser drivers 32a, 32b, 32c, 32d. The setting of the light-emitting power is changed according to changes in the processing conditions or the sensing of the passing position of the light beam.

The memory 52 is for storing the necessary data for control. It stores, for example, the controlled variables for the galvanomirrors 33a, 33b, 33c, 33d, the characteristic of a circuit for sensing the passing position of a light beam (or the offset value of an amplifier), and the order in which the light beams arrive. This enables the optical system unit 13 to be brought into the image formation mode immediately after the power supply has been turned on.

A detailed explanation of light beam passing (or scanning) position control will be given.

Figure 7:
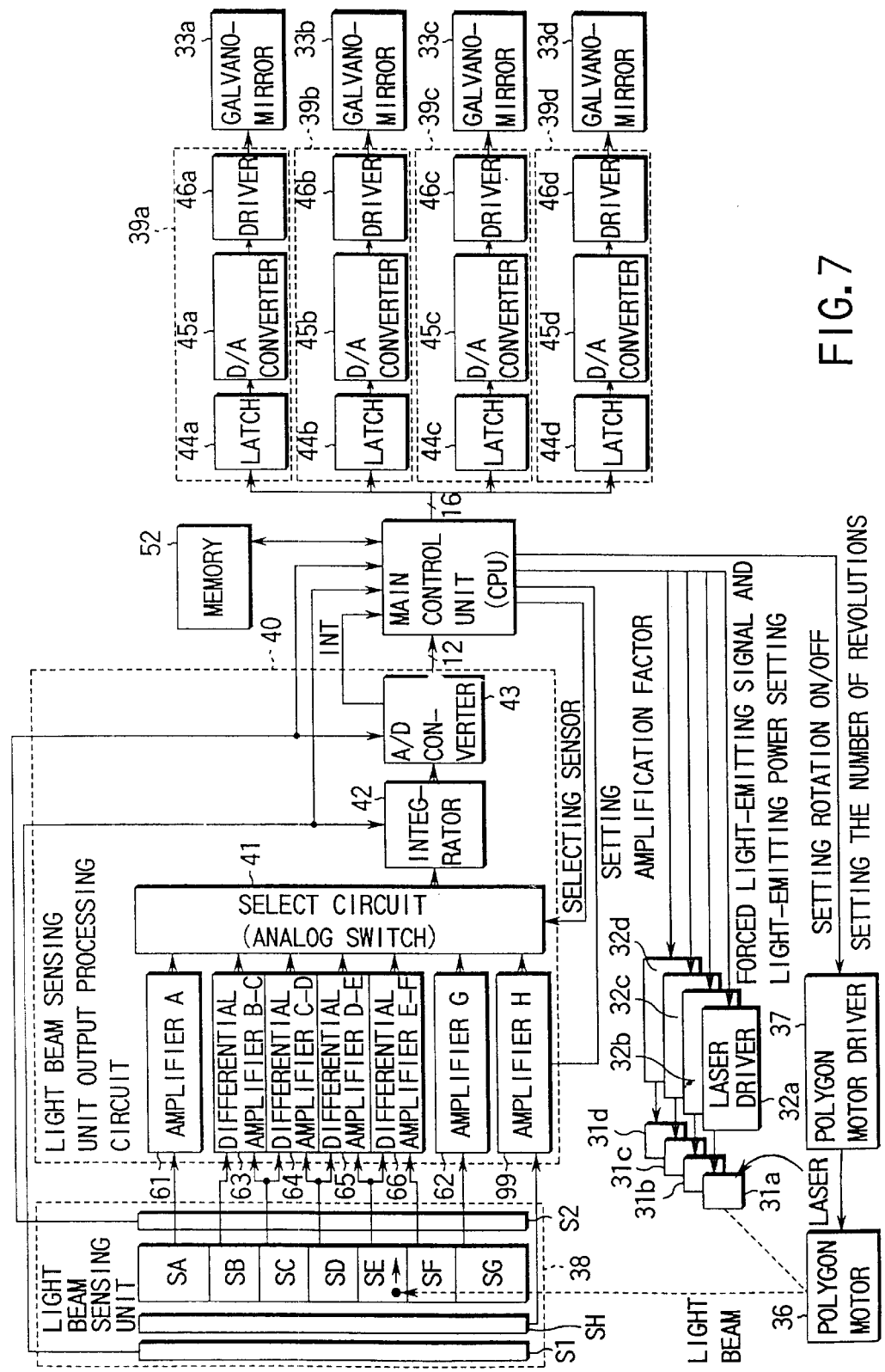
FIG. 7 is a block diagram to help explain passing position control of a light beam by use of the light beam sensing device of FIG. 3.

FIG. 7 is a diagram to help explain light beam passing position control when the light beam sensing unit 38 of FIG. 3 is used. The portions related to light beam control in the block diagram of FIG. 5 are extracted and represented in detail.

As explained earlier, the sensor patterns S1, S2 of the light beam sensing unit 38 output pulse signals indicating that light beams have passed. The sensor patterns SA to SG and SH output independent signals according to the passing positions of light beams.

The output signals of the sensor patterns SA, SG, SH are inputted to amplifiers 61, 62, 99 (hereinafter, referred to as amplifiers A, G, H), respectively. The amplification factor of each of the amplifiers A, G, H is set by the main control unit 41 including a CPU.

The output signals of the sensor patterns SB to SF are inputted to differential amplifiers 63 to 66 (hereinafter, referred to as differential amplifiers B-C, C-D, D-E, E-F) for amplifying the difference between the adjacent output signals from the sensor patterns SB to SF, respectively. The differential amplifier B-C amplifies the difference between the output signals from the sensor patterns SB, SC; the differential amplifier C-D amplifies the difference between the output signals from the sensor patterns SC, SD; the differential amplifier D-E amplifies the difference between the output signals from the sensor patterns SD, SE; and the differential amplifier E-F amplifies the difference between the output signals from the sensor patterns SE, SF.

The output signals from the amplifiers A to E-F and H are inputted to a select circuit (or an analog switch) 41. According to a sensor select signal from the main control unit (CPU) 51, the select circuit 41 selects a signal to be outputted to an integrator 42. The output signal of the amplifier selected by the select circuit 41 is integrated at the integrator 42.

The pulse signal from the sensor pattern S1 is also inputted to the integrator 42. The pulse signal from the sensor pattern S1 is used as a reset signal that resets the integrator 42 and simultaneously starts a new integrating operation. The functions of the integrator 42 is to remove noise and eliminate the effect of the inclination with which the light beam sensing unit 38 has been installed, which will be described in detail later.

The output of the integrator 42 is inputted to an A/D converter 43. The pulse signal from the sensor pattern S2 is also inputted to the A/D converter 43. When receiving the signal from the sensor pattern S2 as a conversion start signal, the A/D converter 43 starts analog-to-digital conversion. Namely, A/D conversion is started with the timing that a light beam passes over the sensor pattern S2.

As described above, immediately before the light beams pass over the sensor patterns SA to SG, the pulse signal from the sensor pattern S1 resets the integrator 42 and at the same time, starts integration. As result, while the light beams are passing over the sensor patterns SA to SG, the integrator 42 integrates the signals indicating the passing positions of the light beams.

Then, immediately after the light beams have passed over the sensor patterns SA to SG, the pulse signal from the sensor pattern 2 triggers the A/D converter 43 to A/D convert the result of integration at the integrator 42. This enables the sense signal with less noise from which the effect of the inclined installation of the light beam sensing unit 38 has been removed to be converted into a digital signal in light beam passing position sensing.

Furthermore, the laser oscillator the power of whose light beam is to be measured is forced to emit light. The polygon mirror 35 causes the light beam to move to and fro over the light beam sensing unit 38. The electric signal from the sensor pattern SH is amplified by the amplifier H. The amplified signal is integrated by the integrator 42 with the timing of the pulse signals from the sensor patterns S1, S2. The integrated signal is A/D converted by the A/D converter 43. The converted signal is supplied to the main control unit 51. This enables the main control unit 51 to sense the power of the light beam on the photosensitive drum 15.

After the A/D conversion, the A/D converter 43 outputs an interrupt signal INT indicating the completion of the process to the main control unit 51. The amplifiers A to E-F and H, select circuit 41, integrator 42, and A/D converter 43 constitute the light beam sensing output processing circuit 40.

In this way, the light beam power sensing signal and light beam position sensing signal converted into digital signals are inputted to the main control unit 51 as absolute or relative light beam power information and light beam position information on the photosensitive drum 15. The main control unit 51 determines the power and passing position of each light beam on the photosensitive drum 15.

On the basis of the absolute or relative light beam power sensing signal and light beam position sensing signal on the photosensitive drum 15, the main control unit 51 sets the light-emitting power for each of the laser oscillators 31a to 31d and calculates the controlled variable for each of the galvanomirrors 33a to 33d. The results of calculation are stored in the memory 52, as the need arises. The main control unit 51 sends the results of calculation to the laser drivers 32a to 32d and the galvanomirror driving circuits 39a to 39d.

The galvanomirror driving circuits 39a to 39d include latches 44a to 44d for storing the results of calculation, respectively. Once the main control unit 51 has written the data into the latches, the values remain unchanged until the data is updated.

The data items held in the latches 44a to 44d are converted by D/A converters 45a to 45d into analog signals (or voltages), which are then inputted to drivers 46a to 46d for driving the galvanomirrors 33a to 33d. The drivers 46a to 46d drive the galvanomirrors 33a to 33d according to the analog signals from the D/A converters 45a to 45d.

In the embodiment, because only one of the amplified output signal of the sensor patterns SA to SG is selected by the select circuit 41, integrated, and A/D converted, the output signals of the sensor patterns SA to SG cannot be inputted to the main control unit 51 at a time.

Accordingly, when the passage of a light beam is unknown, it is necessary to determine the passing position of the light beam by switching the select circuit 41 sequentially and inputting the output signals from all the sensor patterns SA to SG to the main control unit 51 in sequence.

Once where the light beam is passing has been determined, the position at which the light beam will pass can be estimated, so the output signals of all the sensor patterns do not always have to be inputted to the main control unit 51, which will explained in detail later.

Figure 8:
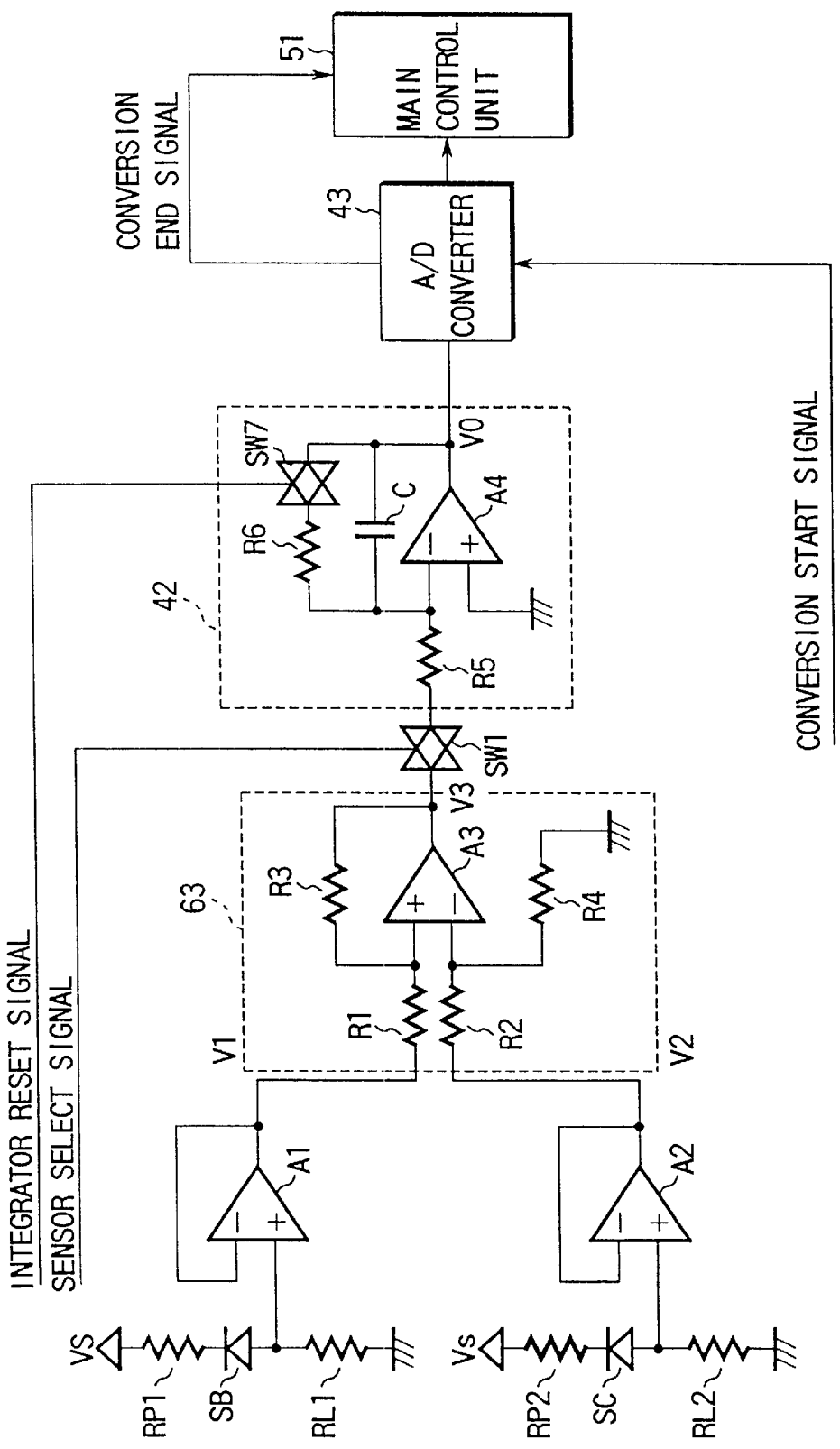
FIG. 8 is a circuit diagram of a concrete example of the light beam sensing output processing circuit.

FIG. 8 shows an example of the configuration of the integrator 42 related to the sensor patterns SB, SC in the light beam sensing output processing circuit 40. In FIG. 8, the currents flowing through the sensor patterns (or photodiodes) SB, SC are current-voltage converted by resistors RP1, RL1, RP2, RL2. The converted signals are amplified by operational amplifiers A1, A2 acting as voltage follower circuits. The amplified signals are sent to a differential amplifier 63. The differential amplifier 63 is composed of resistors R1 to R4 and an operational amplifier A3.

The output of the operational amplifier 73 is sent to the integrator 42 via an analog switch SW1 constituting the select circuit 41. The integrator is composed of an operational amplifier A4, an integration resistor R5, an integration capacitor C, an integrator reset analog switch SW7, and a protective resistor R6. The output of the integrator 42 is sent to the A/D converter 43, which converts the analog value into a digital value. After the A/D conversion, the A/D converter 43 transmits a conversion end signal to the main control unit 51. Receiving the conversion end signal, the main control unit 51 reads the light beam position information converted into the digital value.

The configuration of the integrator 42 related to the sensor patterns SD, SE, SF is basically the same as that of the integrator 42 related to the sensor patterns SB, SC. Therefore, explanation will be omitted.

A detailed operation of the circuit shown in FIG. 7, the relationship between the output of the light beam sensing unit 38, the outputs of the differential amplifiers 63 to 66 and the output of the integrator 42 with respect to the beam passing position, the light beam passing position control, an outline of operation of the printer unit when the power supply has been turned on, and the passing position control of light beams a, b, c and d have been disclosed in detail in U.S. patent application Ser. No. 08/970,801 related to the present invention, filed by Komiya, et al., page 45 line 20 to page 73 line 11 and FIGS. 8 to 15. Therefore, explanation of them will not be given here.

The light beam passing position control routine described in the application Ser. No. 08/970,801 will be executed repeatedly until the beams pass, in the range of ±1 μm, with respect to the ideal passing points, respectively.

The effect of variations in the power of each light beam on the light beam passing position control will be explained.

Figure 9:
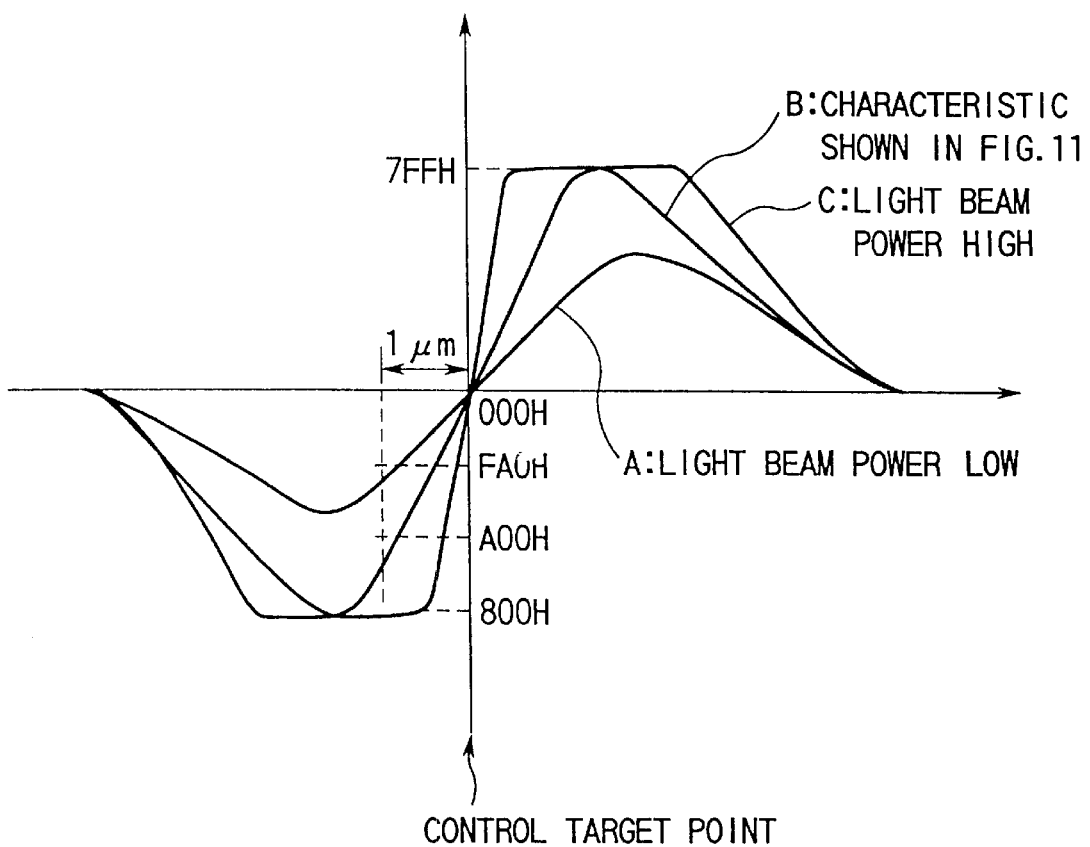
FIG. 9 is a diagram to help explain variations in the power of each light beam in the light beam passing position control.
Figure 10:
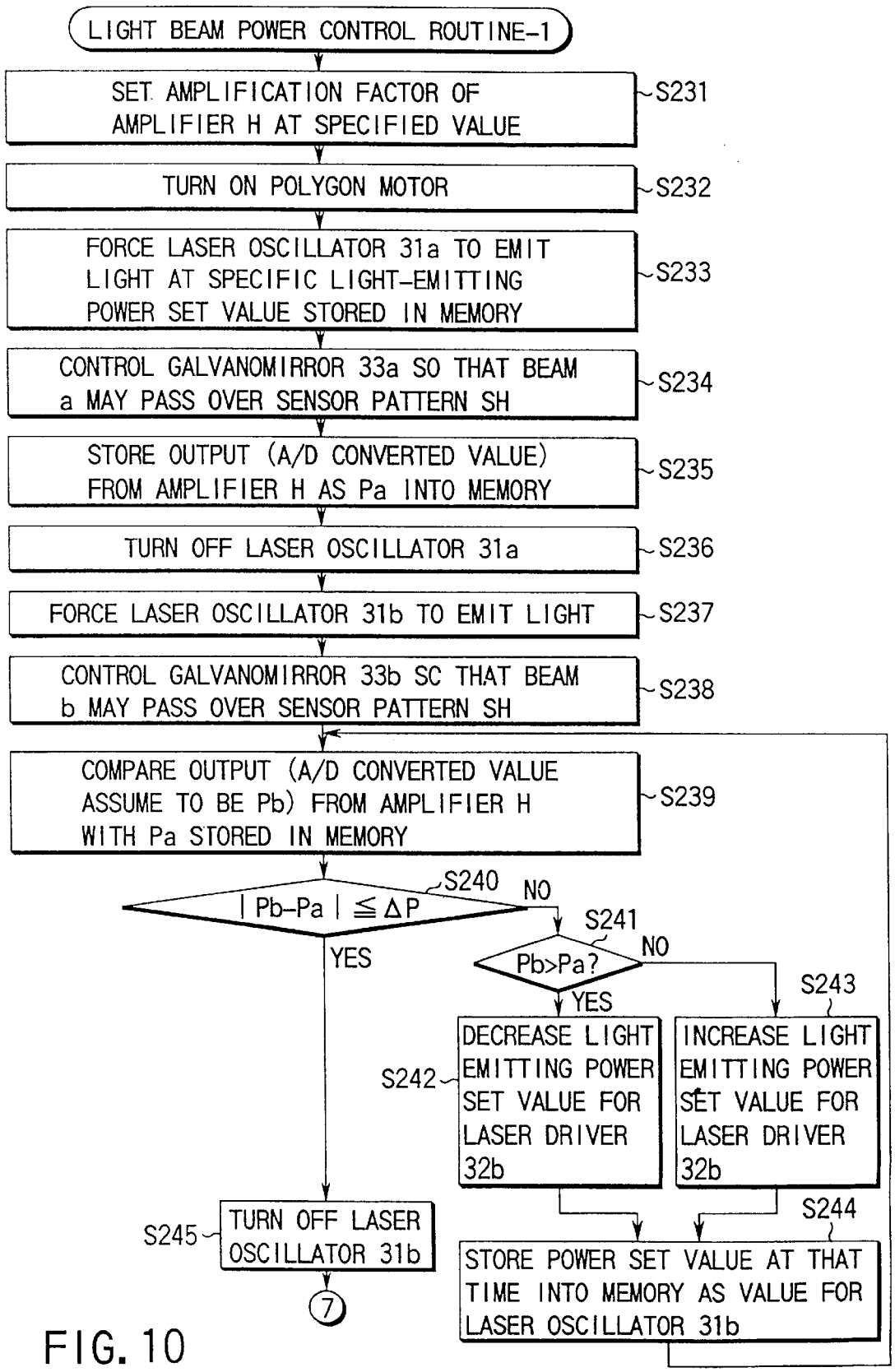
FIG. 10 is a flowchart to help explain a first example of the light beam power control routine.
Figure 11:
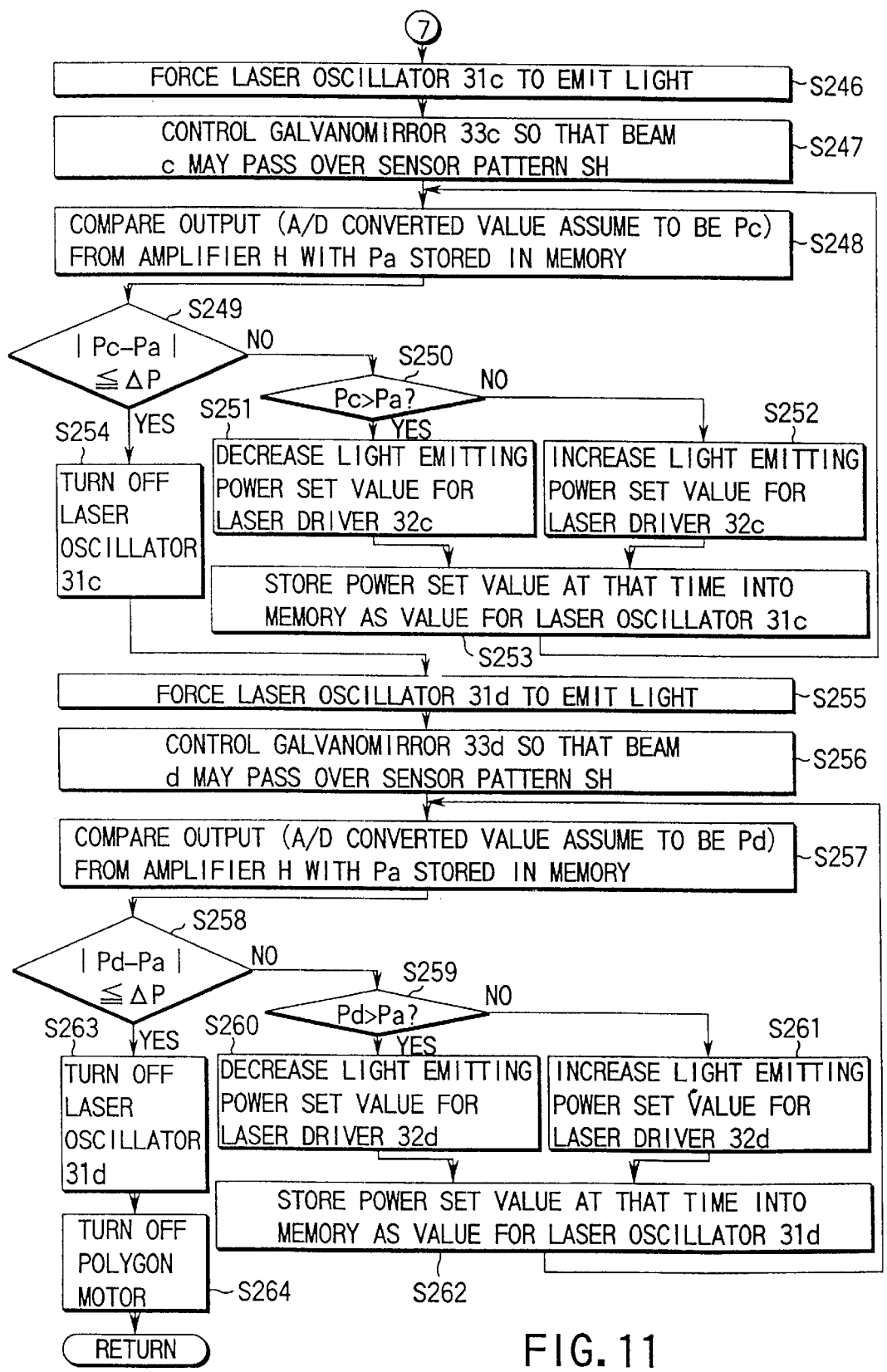
FIG. 11 is a flowchart to help explain a first example of the light beam power control routine.

FIG. 9 shows the relationship between the light beam passing position and the output (or the integrated and A/D converted value) of the differential amplifier when the power of the light beam has varied on the photosensitive drum 15 (or the light beam sensing unit 38).

In FIG. 9, curve B shows the same output characteristic as that of each of the amplifiers B-C, C-D, D-E, and E-F shown in FIG. 9 of the U.S. patent application Ser. No. 08/970,801. As the light beam moves farther apart from the target passing point, the output changes from 000H to 7FFH or from FFFH to 800H gradually. As the light beam moves still farther apart from the target passing point, the output changes from 7FFH to 000H or from 800H to FFFH gradually. This characteristic makes it easy to cause the light beam passing position to correspond to the output of the differential amplifier, which is helpful in control.

In contrast, for example, with the characteristic of curve C for a high power light beam, even if the passing position of the light beam has shifted only slightly from the target point, the output of the differential amplifier will change significantly. When the light beam passing position has shifted more than a specific value, the output of the differential amplifier will be fixed at 7FFH or 800H. Then, the output value of the differential amplifier will remain unchanged unless the light beam passing position has changed heavily. Specifically, when the integral value of the amplifier B-C has adjusted in the range from A00H to FA0H as at step S49 in FIG. 15 of the U.S. patent application Ser. No. 08/970,801, too high beam power causes a shift in the beam passing position to be adjusted with high accuracy far surpassing the permissible error. In this case, the beam position adjustment is difficult and takes time.

Conversely, when the power of the light beam is low, this gives the characteristic of curve A. The output of the differential amplifier makes a small change for the change of the light beam passing position, resulting in a poor signal-to-noise ratio. Specifically, when the integral value of the amplifier B-C has adjusted in the range from A00H to FA0H as at step S49 in FIG. 15 of the U.S. patent application Ser. No. 08/970,801, too low beam power causes a shift in the beam passing position to be adjusted with low accuracy far exceeding the permissible error.

For the light beam passing position control, at least the power of each light beam must be equal. It is desirable that the light beam should have such power that gives the characteristic of curve B in FIG. 9. In the graph of FIG. 9, for example, setting the amplification factor of the differential amplifier at a suitable value enables the characteristic of curve A to change to that of curve B or the characteristic of curve C to change to that of curve B.

Figure 12:
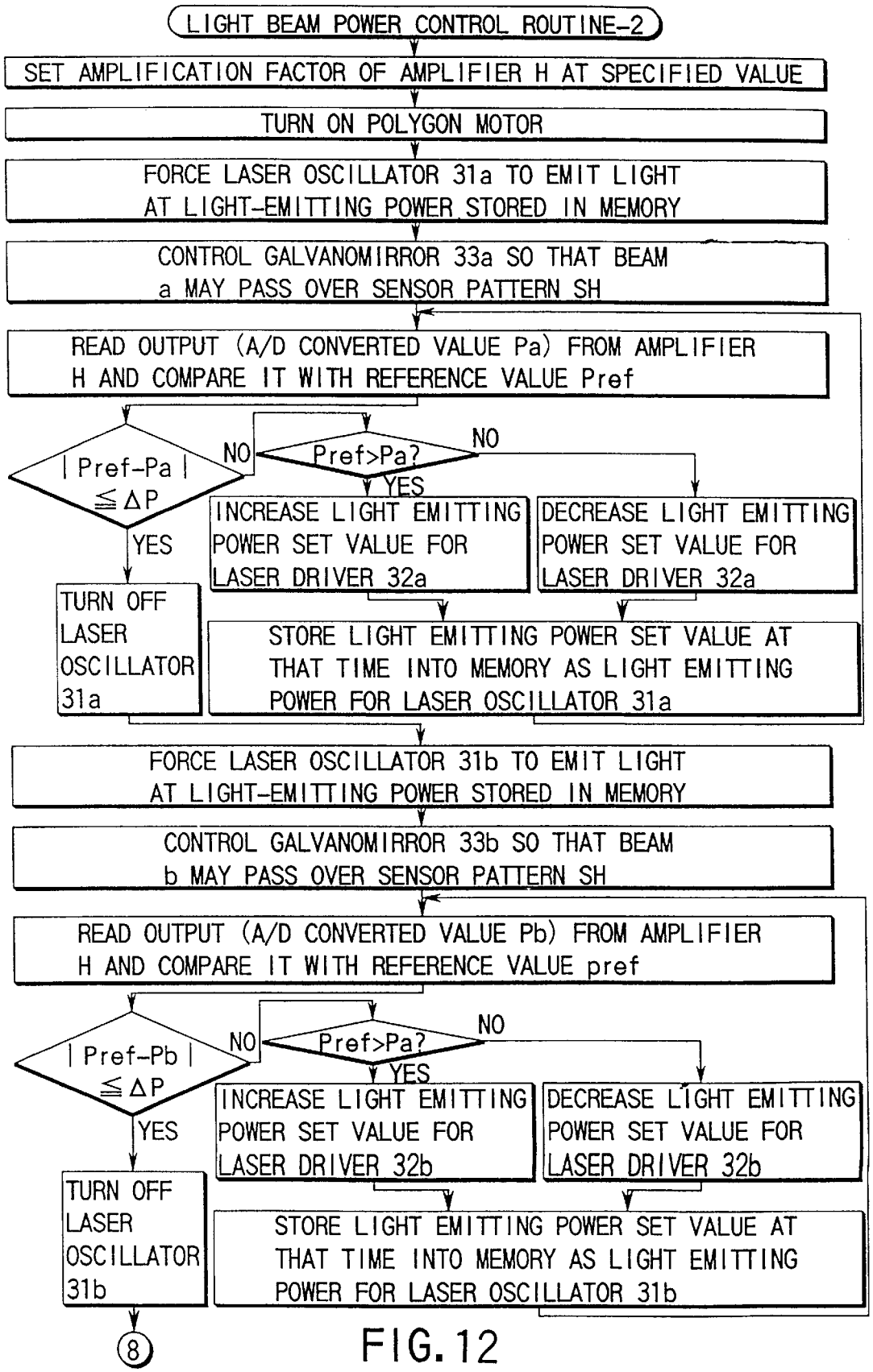
FIG. 12 is a flowchart to help explain a second example of the light beam power control routine.

A first embodiment of the light beam power control routine at steps S3 and S2 in FIG. 12 of the U.S. patent application Ser. No. 08/970,801 will be described by reference to the flowcharts shown in FIGS. 10 and 11.

The main control unit 51 sets the amplification factor of the amplifier H at a specific value (S231). With each light beam passing over the sensor pattern SH, when the output of the amplifier H is integrated at the integrator 42 and A/D converted at the A/D converter 43, use of the specific value prevents the resulting value from being saturated and allows the value to change in proportion to the power of the light beam.

Next, the main control unit 51 turns on the polygon motor 36, thereby rotating the polygon mirror 35 at a specific number of revolutions (S232). Then, the main control unit 51 forces the laser oscillator 31a to emit light at a specific value stored in the memory 52 (S233). After this, the polygon mirror 35 causes the light beam a to start scanning.

In general, in an image forming apparatus using electronic photographic processing, the power of the light beam must be changed, depending on the environment in which the image forming apparatus is installed or its using conditions (including aging). The memory 52 stores data on the appropriate power of each light beam under such various conditions.

Then, the main control unit 51 controls the galvanomirror 33a so that the light beam a may pass over the sensor pattern SH (S234). The light beam a has to pass through almost the center of the sensor pattern SH so as not to stray from the sensor pattern SH. If the beam a deviated from the sensor pattern SH, the sensed power would have a smaller value. Since the sensor pattern SH used for light beam power control has a sufficient size as described in FIG. 3, it is impossible that such a problem will take place.

When the light beam a is set so as to pass through almost the center of the sensor pattern SH in the initial setting at the time of turning on the power supply, the process at step S234 can be omitted.

Then, when the light beam s starts to pass over the sensor pattern SH, the A/D converter 43 inputs a value proportional to the power of the beam a to the main control unit 51. The main control unit 51 stores the value (preferably, the average value of an integral multiple of the number of faces of the polygon mirror 35) into the memory 52 as the optical power Pa of the light beam a on the photosensitive drum 15 (S235) and turns off the laser oscillator 31a (S236).

Next, the main control unit 51 forces the laser oscillator 31b to emit light (S237) and controls the galvanomirror 33b as with the laser beam a, thereby causing the light beam b to pass over the sensor pattern SH (S238). In this case, too, when the light beam b is set so as to pass through almost the center of the sensor pattern SH in the initial setting, the process at step S238 can be omitted.

Then, the A/D converter 43 inputs a value proportional to the power of the beam b on the photosensitive drum 15 to the main control unit 51. The main control unit 51 determines the value to be the optical power Pb and compares it with the optical power Pa of the light beam a on the photosensitive drum 15 stored in the memory 52 (S239). In the case of the light beam b, too, it is desirable that the output value of the A/D converter 43 should be taken in as many times as an integral multiple of the number of faces of the polygon mirror 35 and the average value of the output values be determined to be Pb.

As a result of comparing the optical power Pa of the beam a with the optical power Pb of the beam b on the photosensitive drum 15, if the difference is smaller than or equal to a specific value (ΔP) (preferably, "0"), there will be no problem in terms of picture quality. If the difference is larger than the value, a picture quality problem will arise and correction be needed.

For example, as a result of comparing the optical power Pb with the optical power Pa, if Pb is larger than Pa and the difference between them is larger than ΔP (S240, S241), decreasing the light-emitting power set value for the laser driver 32b enables the optical power of the light beam b on the photosensitive drum 15 to be decreased (S242).

Conversely, as a result of comparing the optical power Pb with the optical power Pa, if Pa is larger than Pb and the difference between them is larger than ΔP (S240, S241), increasing the light-emitting power set value for the laser driver 32b enables the optical power of the light beam b on the photosensitive drum 15 to be increased (S243).

After having corrected the optical power of the beam b on the photosensitive drum 15, the main control unit 51 stored the light-emitting power set value at that time into the memory 52 as the value for the laser oscillator 31b. Then, it returns control to step S239, senses the optical power of the beam b on the photo-sensitive drum 15 again, compares Pb with Pa, and repeats correction until the difference between them becomes equal to or smaller than ΔP.

In this way, the difference between the power of the beam a and that of the beam b can be made equal to or smaller than the specific value (ΔP).

Similarly, the light beams c and d are processed in a similar manner at steps S245 to S264, thereby enabling the difference in optical power between the light beams a, b, c, and d on the photosensitive drum 15 to be equal to or smaller than the specific value (ΔP).

While in the embodiment, the light beam a has been used as a reference, the light beam b, c, or d may be used as a reference. It is desirable that the specific value (ΔP) should be made 1% or less of the reference (the value of Pa).

Figure 13:
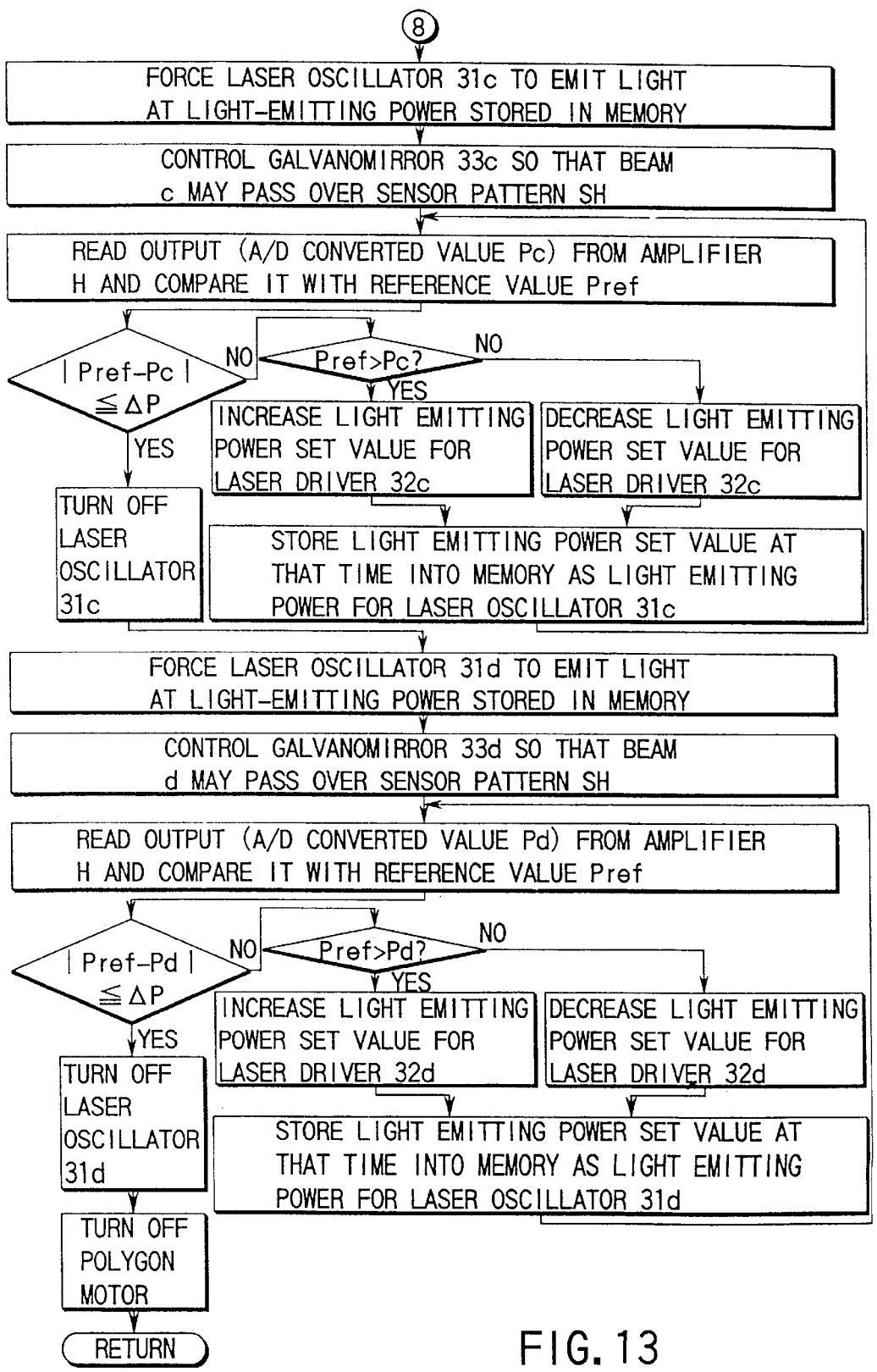
FIG. 13 is a flowchart to help explain a second example of the light beam power control routine.

A second embodiment of the light beam power control routine will be described by reference to the flowcharts shown in FIGS. 12 and 13.

The second embodiment of the light beam power control routine is the same as the first embodiment except for the way of determining a reference for controlling the power of a light beam. In the first embodiment, the control reference for light beam power has been determined on the basis of the light beam a and the respective light beams are forced to have almost the same optical power. In contrast, in the second embodiment, the power of each light beam is controlled on the basis of a predetermined reference value Pref. The reference value Pref is a predetermined value that prevents a beam power signal from being saturated in the light beam sensing output processing circuit 40 and maximizes the dynamic range of the circuit 40 as shown by curve B in FIGS. 7 or 18.

The sensitivity of the sensor pattern SH is corrected beforehand so that it may be the same for each image forming apparatus. This enables the power of each light beam to be controlled on the basis of an absolute reference. For example, the sensitivity of the sensor pattern SH is adjusted (or corrected) in advance so that the output of the amplifier H may have a value of 100H when a light beam with optical power equivalent to 100 μW passes over the sensor pattern SH at a specific scanning speed, have a value of 200H for a light beam with optical power equivalent to 200 μW, and have a value of 300H for a light beam with optical power equivalent to 300 μW. The previously adjusted amplification factor of the amplifier H enables the sensor pattern SH to be used as a type of a measuring instrument. Such a configuration of the image forming apparatus prevents optical power from one apparatus to another and enables light beam power on the photosensitive drum 15 to be controlled.

As described above, with the embodiment, use of the light beam sensing unit 38 with the aforementioned sensor pattern on the same level or on an extension of the surface of the photosensitive drum 15 enables not only the difference in power between the respective light beam on the photosensitive drum 15 to be controlled to a specific value or less but also the absolute value of the beam power to be controlled.

Furthermore, a controlled variable for controlling the respective light beams so that their relative positions may take the optimal positions is calculated by use of the light beam sensing unit 38. According to the calculated controlled variable, the galvanomirrors are controlled which change the relative positions of the individual light beams on the surface of the photosensitive drum 15. Accordingly, the assembly of the optical system requires neither special accuracy nor special adjustment. Moreover, even if the optical system has changed due to environmental changes or aging, the positions of the individual light beams on the surface of the photosensitive drum 15 can be controlled so that they may constantly have the optimal positional relationship. Therefore, high picture quality can be always assured.

Furthermore, the sensor pattern SH for sensing light beam power in the light beam sensing unit 38 is sufficiently long in the sub-scanning direction, it is not necessary to move the light beam controlled to the proper scanning position to another scanning position (e.g., move the beam to the sensor pattern SA or SG) each time the beam power is adjusted. This enables the copying speed to be made faster.

The light beam sensing unit 38 with more than one resolution (e.g., two types of resolution) will be explained.

Figure 14:
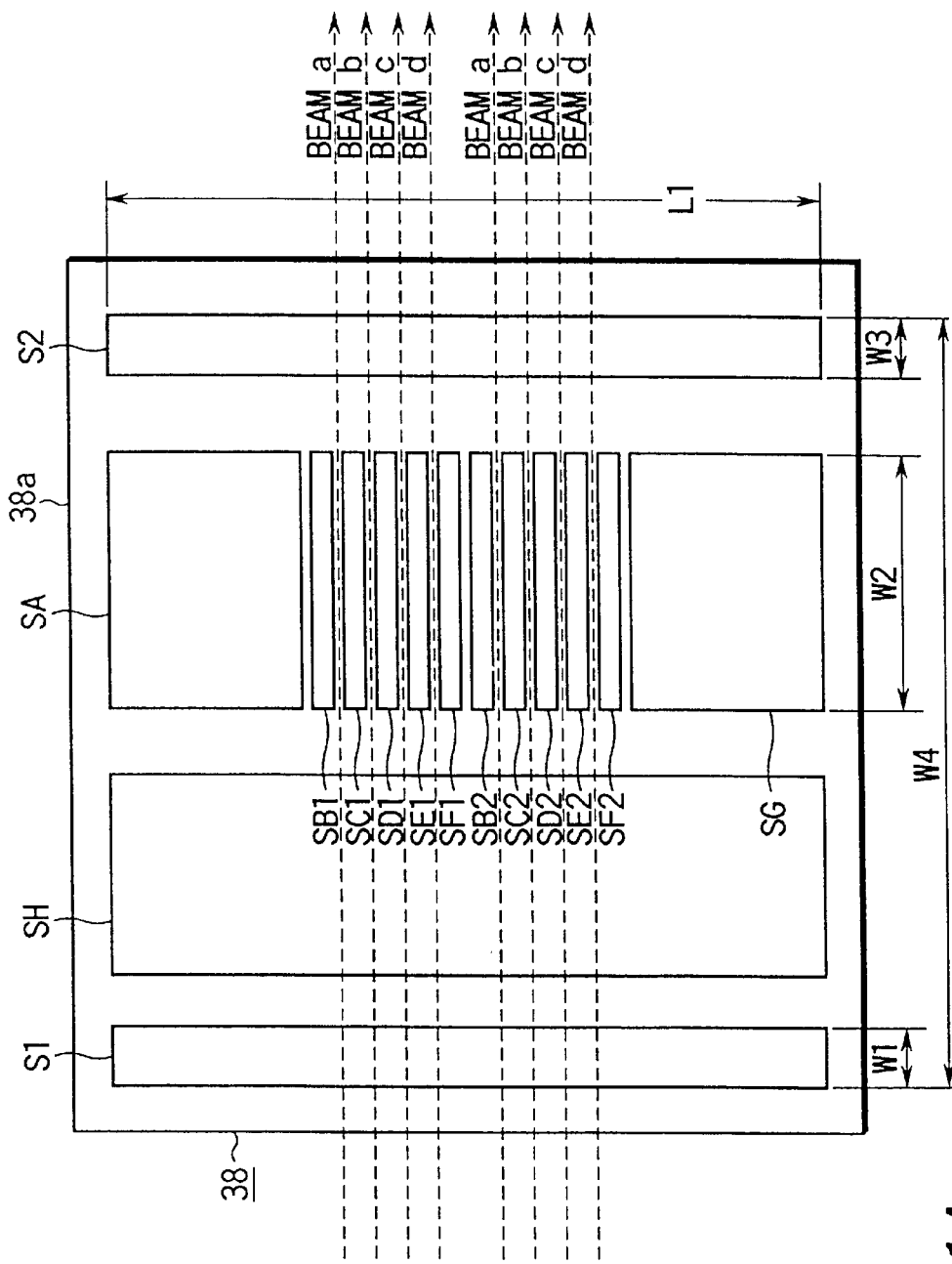
FIG. 14 pictorially shows the configuration of the light beam sensing device corresponding to two types of resolution.

FIG. 14 pictorially shows the configuration of the light beam sensing unit 38 with two types of resolution and the direction in which light beams scan. The light beam sensing unit 38 of FIG. 14 differs from that of FIG. 3 in that the sensor patterns in FIG. 14 are provided so as to correspond to the two types of resolution, whereas the sensor patterns in FIG. 3 for sensing the passing positions of light beams are provided for only one resolution. The remaining configuration of FIG. 14 is the same as that of FIG. 3.

Figure 15:
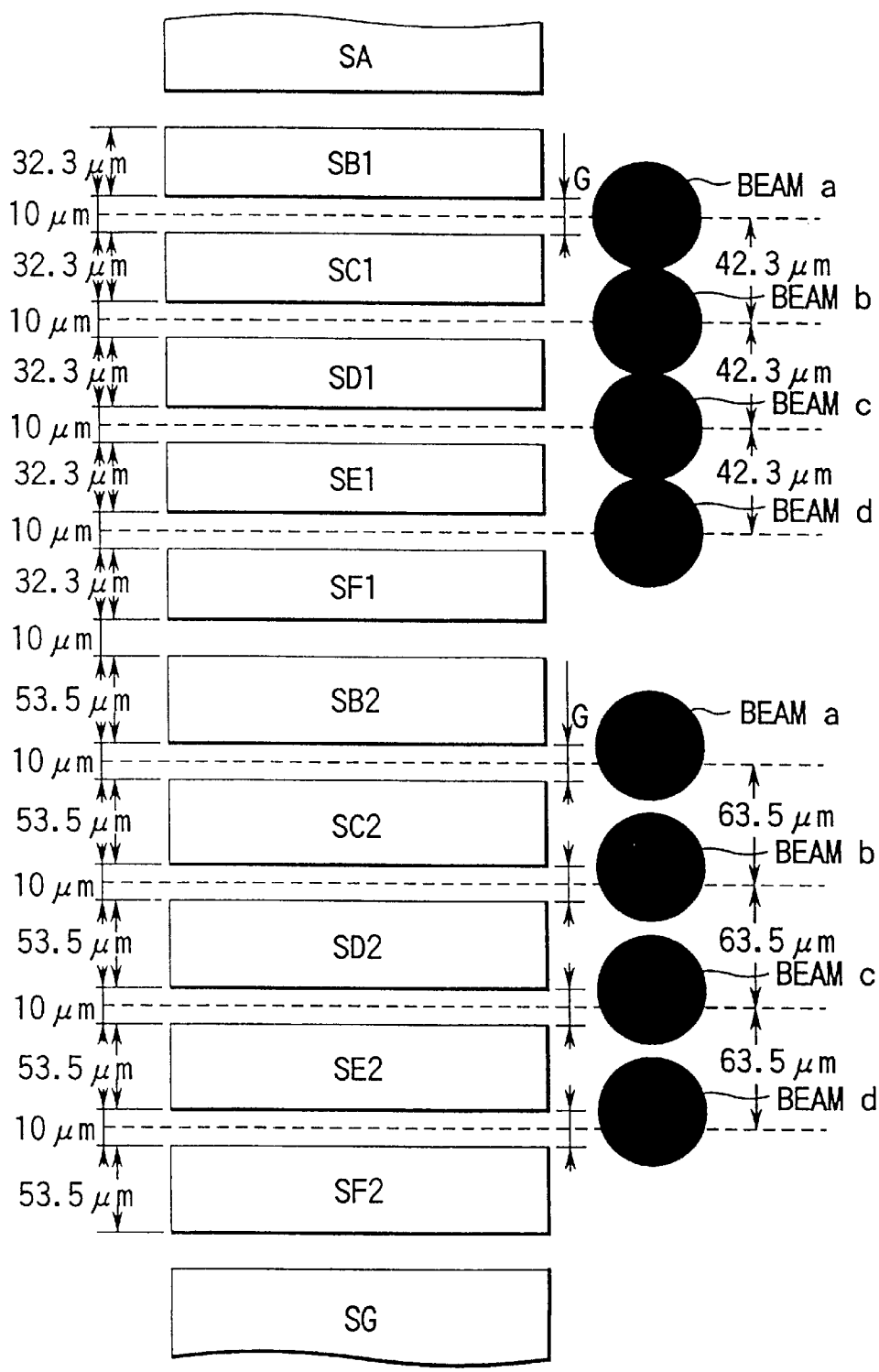
FIG. 15 schematically shows the structure of the important portion of the light beam sensing device in FIG. 14.

Specifically, sensor patterns SB1 to SF1 are light beam passing position sensing sensor patterns for a first resolution (e.g., 600 dpi). As shown in FIG. 15, they have the same shape (of the same area) and are arranged at intervals of about 42.3 μm (25.4 mm÷600). When the passing positions of the light beams a to d are controlled so that each beam may pass through each gap G between adjacent sensor patterns, the light beams scan the drum 15 at intervals of 42.3 μm.

More specifically, the light beams are controlled as follows:

Light beam a is controlled so as to pass through the mid-point between the sensor patterns SB1 and SC1.

Light beam b is controlled so as to pass through the mid-point between the sensor patterns SC1 and SD1.

Light beam c is controlled so as to pass through the mid-point between the sensor patterns SD1 and SE1.

Light beam d is controlled so as to pass through the mid-point between the sensor patterns SE1 and SF1.

Because light beam passing position control has been explained, it will not be described here.

Furthermore, sensor patterns SB2 to SF2 are light beam passing position sensing sensor patterns for a second resolution (e.g., 400 dpi). As shown in FIG. 15, they have the same shape (of the same area) and are arranged at intervals of about 63.5 μm (25.4 mm÷400). When the passing positions of the light beams a to d are controlled so that each beam may pass through each gap G between adjacent sensor patterns, the light beams scan the drum 15 at intervals of 63.5 μm.

More specifically, the light beams are controlled as follows:

Light beam a is controlled so as to pass through the mid-point between the sensor patterns SB2 and SC2.

Light beam b is controlled so as to pass through the mid-point between the sensor patterns SC2 and SD2.

Light beam c is controlled so as to pass through the mid-point between the sensor patterns SD2 and SE2.

Light beam d is controlled so as to pass through the mid-point between the sensor patterns SE2 and SF2.

Because the basic operation of the light beam passing position control is the same as in the case of 600 dpi, it will not be explained here.

Figure 16A:
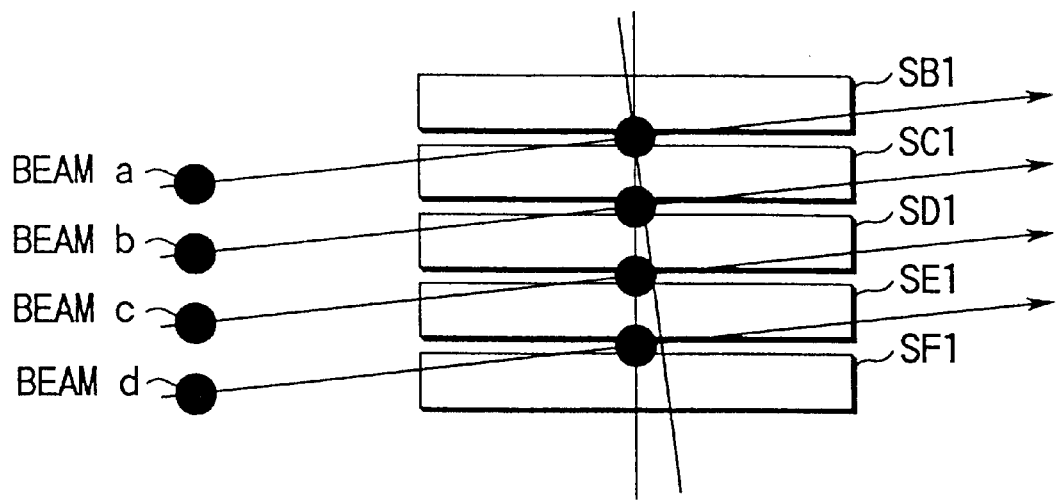
FIGS. 16A and 16B are diagrams to help explain the inclination of the direction of light beam scanning to the light beam sensing device.
Figure 16B:
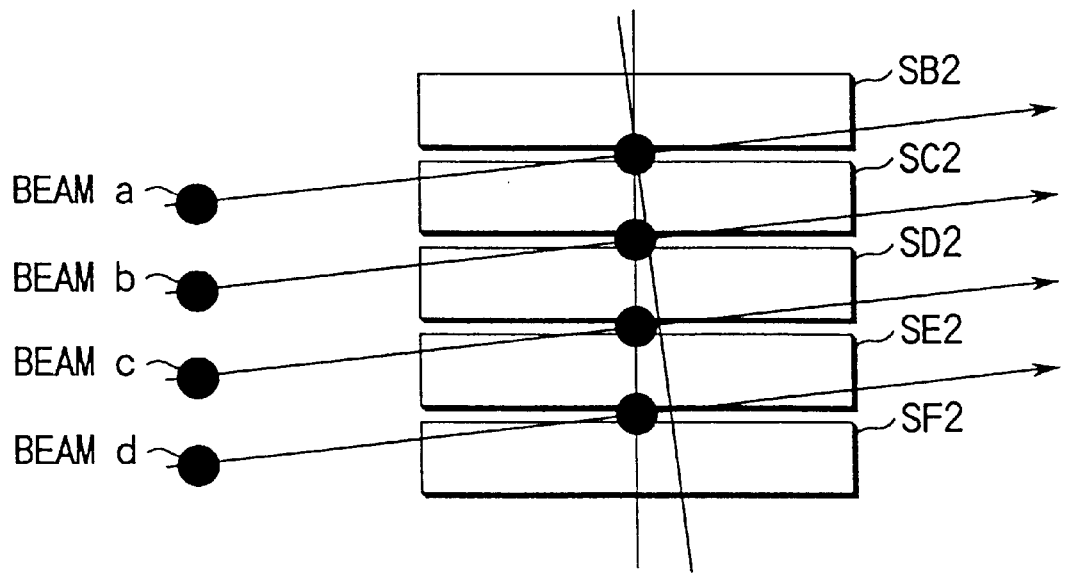

FIGS. 16A and 16B show the relationship between the sensor patterns SB1 to SF1, SB2 to SF2 and the scanning positions of the light beams a to d when the light beam sensing unit 38 is installed with an inclination to the direction in which the light beans scan. FIG. 16A is related to the first resolution (600 dpi) and FIG. 16B is related to the second resolution (400 dpi). In FIGS. 16A and 16B, the scanning direction of each of the light beams a to d is represented as if it were inclined with respect to the light beam sensing unit 38.

For example, it is assumed that a relative inclination of a sensor pattern to a light beam is 5°. The first resolution gives Table 1, where the distance between light beam a and light beam b decreases by only about 0.5 μm. The second resolution gives Table 2, where the distance between light beam a and light beam b decreases by only about 0.7 μm.

TABLE 1

| | Design Value (Inclination: 0 deg) | Inclination: 5 deg |
|---|---|---|
| Distance between Beam a and Beam b | 127 μm | About 126.5 μm |

TABLE 2

| | Design Value (Inclination: 0 deg) | Inclination: 5 deg |
|---|---|---|
| Distance between Beam a and Beam b | 190.5 μm | About 189 μm |

As described above, even when the light beam passing position sensing sensor patterns for more than one resolution are used, arranging the sensor patterns linearly in the sub-scanning direction of light beams makes it possible to construct the light beam sensing unit 38 with sufficient allowance for inclined installation, as compared with the conventional equivalent shown in FIG. 5B.

Figure 17:
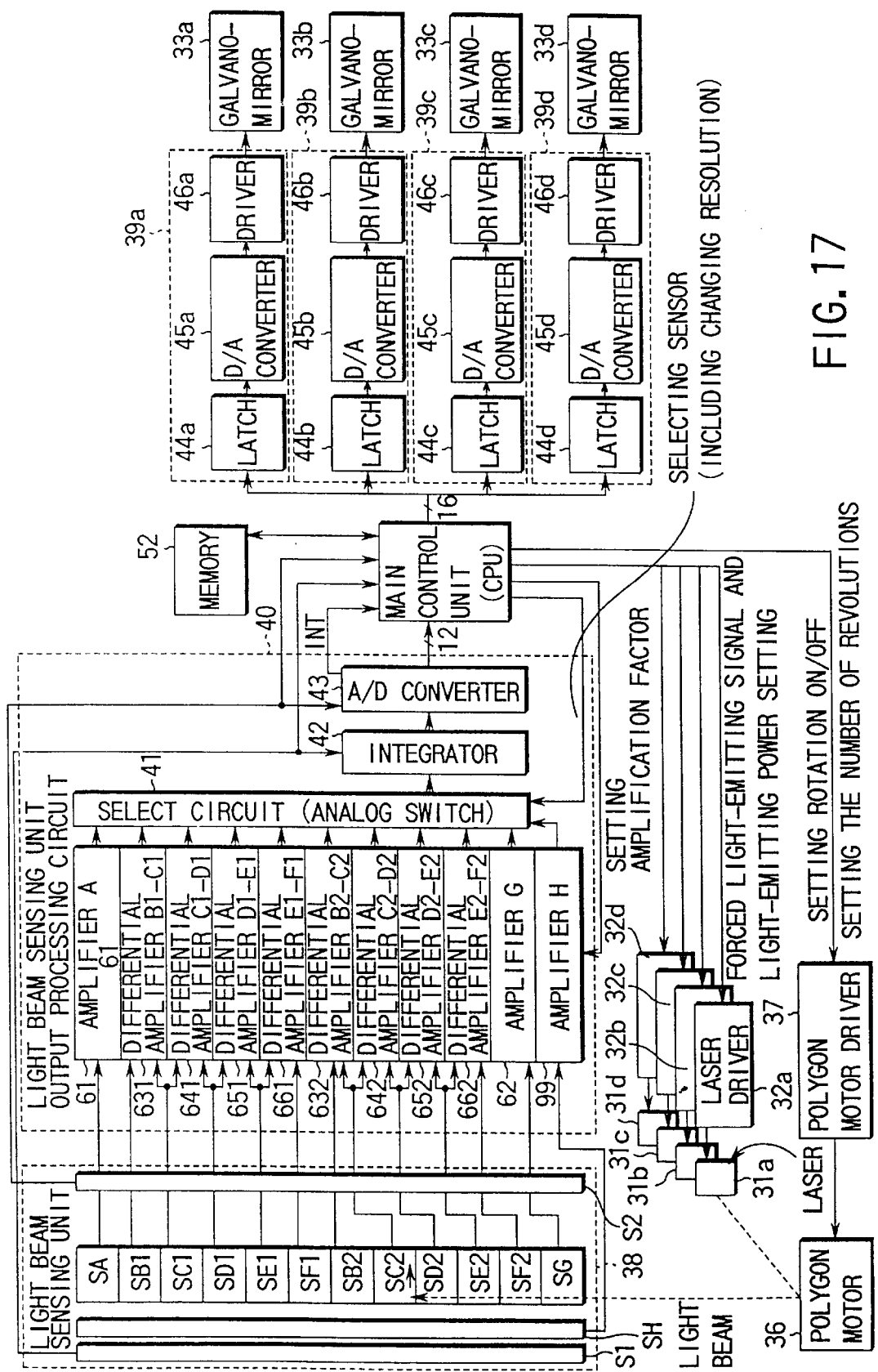
FIG. 17 is a block diagram to help explain passing position control of a light beam by use of the light beam sensing device of FIG. 14.

FIG. 17 is a diagram to help explain the light beam passing position control when the light beam sensing unit 38 of FIG. 14 is used. FIG. 17 differs from FIG. 7 in that differential amplifiers are provided so as to correspond to the sensor patterns SB1 to SF1, SB2 to SF2 in the configuration of the light beam sensing output processing circuit 40 and that a resolution change signal is added to the sensor select signal. The remaining configuration is basically the same as that of FIG. 7, so its explanation will be omitted.

In the light beam sensing output processing circuit, a differential amplifier 631 amplifies the difference between the outputs of the sensor patterns SB1 and SC1, a differential amplifier 641 amplifies the difference between the outputs of the sensor patterns SC1 and SD1, a differential amplifier 651 amplifies the difference between the outputs of the sensor patterns SD1 and SE1, and a differential amplifier 661 amplifies the difference between the outputs of the sensor patterns SE1 and SF1. Furthermore, a differential amplifier 632 amplifies the difference between the outputs of the sensor patterns SB2 and SC2, a differential amplifier 642 amplifies the difference between the outputs of the sensor patterns SC2 and SD2, a differential amplifier 652 amplifies the difference between the outputs of the sensor patterns SD2 and SE2, and a differential amplifier 662 amplifies the difference between the outputs of the sensor patterns SE2 and SF2.

The outputs of the amplifiers 631, 641, 651, 661, 632, 642, 652, 662 are inputted to the select circuit (analog switch) 41. In response to the sensor select signal from the main control unit (CPU) 51, the select circuit 41 selects a signal to be inputted to the integrator 42.

Specifically, when the light beam passing position control is performed with the first resolution (600 dpi), the select circuit 41 selects one of the following differential amplifiers and the passing position control of the corresponding light beam is performed:

Differential amplifier 631: light beam a

Differential amplifier 641: light beam b

Differential amplifier 651: light beam c

Differential amplifier 661: light beam d

Similarly, when the light beam passing position control is performed with the second resolution (400 dpi), the select circuit 41 selects one of the following differential amplifiers and the passing position control of the corresponding light beam is performed:

Differential amplifier 632: light beam a

Differential amplifier 642: light beam b

Differential amplifier 652: light beam c

Differential amplifier 662: light beam d

Figure 18:
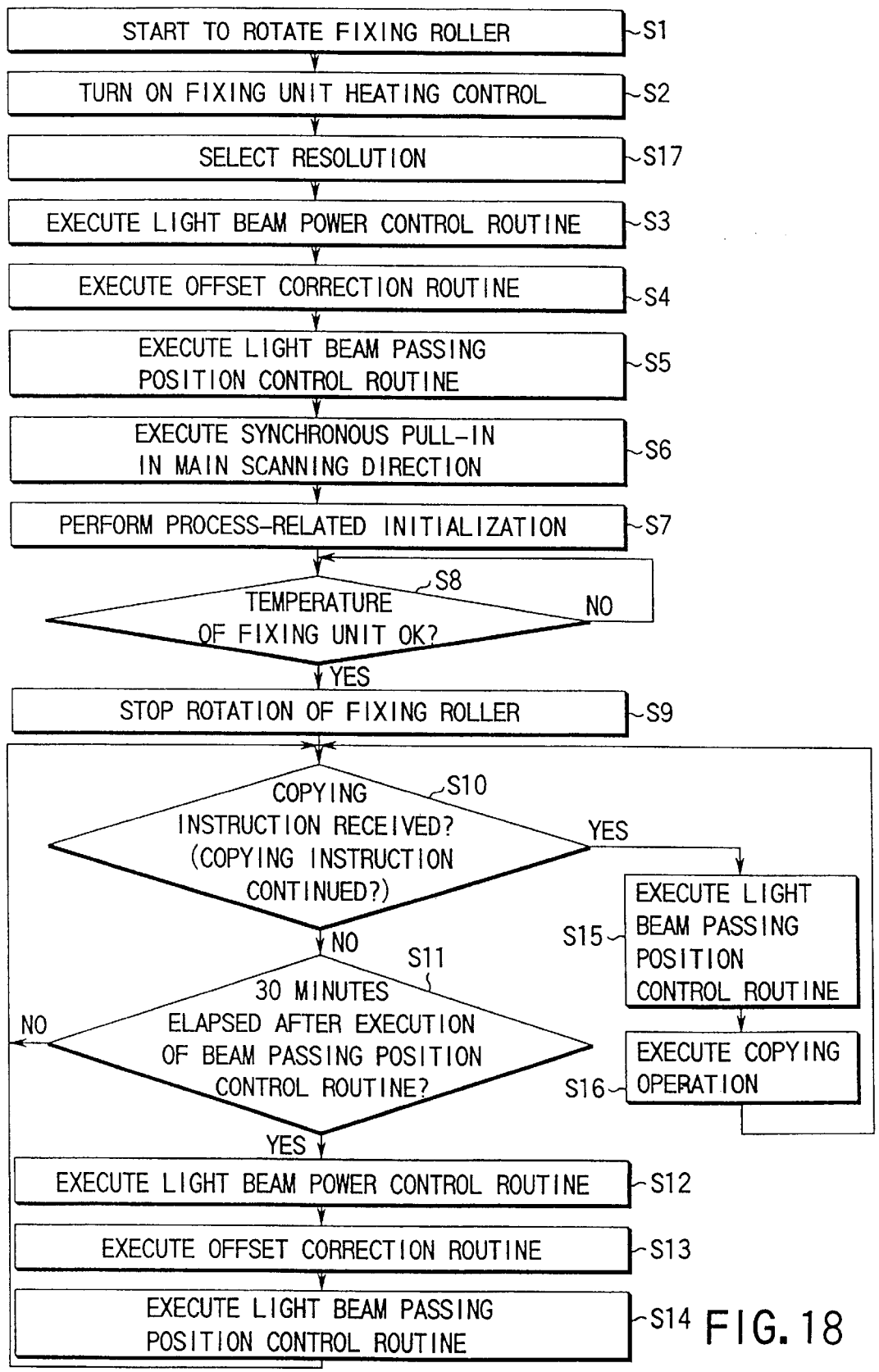
FIG. 18 is a flowchart to help briefly explain the operation of the printer section when the power supply has been turned on in the light beam sensing device of FIG. 14.

FIG. 18 is a flowchart to help explain the operation of the printer unit 2 at the time of turning on the power supply when the light beam sensing unit 38 of FIG. 14 is used. The flowchart of FIG. 18 differs from that of FIG. 14 in that a process at step S17, or a resolution selecting routine, is inserted between step S2 and step S3. Since the rest is the same as FIG. 14, its explanation will be omitted. In the resolution selecting routine (S17), the number of the polygon motor 36 according to the selected resolution, the power of the light beam at the time of image formation, and the select circuit 41 are set. Specifically, the setting is done as follows:

With the first resolution (600 dpi),

Number of revolutions of polygon motor 36: REV1 (scanning speed: VS)

Power of light beam (light emitting power): POW1

Select circuit 41 (in light beam position control):
 differential amplifier 631 (light beam a)
 differential amplifier 641 (light beam b)
 differential amplifier 651 (light beam c)
 differential amplifier 661 (light beam d)
With the second resolution (400 dpi),
Number of revolutions of polygon motor 36: REV2 (scanning speed: VS')
Power of light beam (light emitting power): POW2
Select circuit 41 (in light beam position control):
 differential amplifier 632 (light beam a)
 differential amplifier 642 (light beam b)
 differential amplifier 652 (light beam c)
 differential amplifier 662 (light beam d)

As described above, with the present invention, sensor patterns in a light beam position sensing unit for sensing the positions of light beams that scan the surface of the photosensitive drum are arranged linearly in the sub-scanning direction of the light beams at intervals corresponding to more than one resolution. This makes it possible to construct a light beam position sensing unit with sufficient allowance for inclined installation.

Therefore, the accurate sensing of light beam scanning positions enables the light beams to be constantly controlled to the ideal positions on the surface of the photosensitive drum with more than one resolution. This always assures high picture quality.

Furthermore, after the power of each light beam that scans the surface of the photosensitive drum has been sensed and power control has been performed so that the sensed values may lie in a specific range, the passing position control of the light beams on the surface of the photosensitive drum and synchronizing control in the main scanning direction are performed. This enables the light beams to be substantially controlled to the ideal positions on the surface of the photosensitive drum. This always assures high picture quality.

In other words, when more than one light beam is used, the assembly of the optical system requires neither special accuracy nor special adjustment. Moreover, even if the optical system has changed due to environmental changes or aging, the positions of the individual light beams on the surface of the photosensitive drum can be controlled so that they may constantly have the optimal positional relationship. Therefore, it is possible to constantly obtain high-quality images without shifted dots in the main scanning direction and sub-scanning direction.

While in the embodiments, the case where the multi-beam optical system has been applied to the digital copying machine has been explained, the present invention is not limited to this. For instance, the present invention may be applied to a digital copying machine using a single-light-beam optical system or to image forming apparatuses such as printer other than digital copying machines.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light beam scanning apparatus comprising:
 a plurality of light sources to generate light beams;
 a plurality of beam combining units, provided to said light sources, respectively, to optically combine the light beams;
 a single scanning unit to reflect the combined light beams toward a surface to be scanned, and to cause the light beams to be scanned over the surface in a main scanning direction;
 a light beam power sensor, over which the light beams reflected from said single scanning unit are to be scanned, to sense power of the light beams on the surface; and
 a light beam power controller to control said light sources on the basis of a result of sensing by said light beam power sensor,
 wherein:
  said light beam power sensor comprises a first light-receiving element, a second light-receiving element and a third light-receiving element, said second and third light-receiving elements respectively provided on both sides of said first light-receiving element, an integrator for integrating an output of said first light receiving element, and a converter for converting a result of integration by said integrator; and
  wherein said integrator is reset when a light beam has passed over said second light-receiving element, and at the same time starts integration; and
  wherein said converter converts the result of the integration when the light beam has passed over said third light-receiving element.

2. A light beam scanning apparatus according to claim 1, wherein said light beam power controller controls said light sources so that the power of each of the light beams scanned over the surface is set at a predetermined value.

3. A light beam scanning apparatus according to claim 1, wherein said light beam power controller controls said light sources so that a difference in power between light beams scanned over the surface is equal to or less than a predetermined value.

4. A light beam scanning apparatus according to claim 3, wherein the predetermined value is equivalent to 1% of the power of one of the light beams.

5. A light beam scanning apparatus according to claim 1, wherein power control by said light beam power controller is performed immediately after power is supplied to said apparatus, and is performed at regular intervals.

6. A light beam scanning apparatus according to claim 1, further comprising:
 a first light beam position sensor, that includes light-receiving elements arranged linearly at intervals corresponding to a first resolution in a sub-scanning direction perpendicular to the main scanning direction, to sense positions through which the light beams caused by said scanning unit to be scanned over the surface pass in the sub-scanning direction;
 a second light beam position sensor, that includes light-receiving elements arranged linearly at intervals corresponding to a second resolution different from the first resolution in the sub-scanning direction, to sense positions through which the light beams caused by said scanning unit to be scanned over the surface pass in the sub-scanning direction; and
 a light beam passing position controller to control each of the light beams caused by said scanning unit to be scanned over the surface on the basis of an associated one of results of sensing by said first and second light beam position sensors, so that said each of the light beams passes through a proper position in accordance with an associated one of the first and second resolution.

7. A light beam scanning apparatus according to claim 6, wherein the first light beam position sensor includes photodiodes arranged linearly in the sub-scanning direction as the first light-receiving element.

8. An image forming apparatus comprising:

a plurality of light sources to generate light beams;

a plurality of beam combiners to combine the light beams;

a single scanning unit to reflect the combined light beams toward a surface to be scanned, and to cause the light beams to be scanned over the surface in a main scanning direction;

a light beam power sensor, over which the light beams reflected from said single scanning unit are to be scanned, to sense power of the light beams on the surface, which are reflected by said scanning unit;

a light beam power controller to control said light sources on the basis of a result of sensing by said light beam power sensor; and an image forming element to form an image on the surface by using said light sources which are controlled by said light beam power controller, wherein:

said light beam power sensor comprises a first light-receiving element, a second light-receiving element and a third light-receiving element, said second and third light-receiving elements respectively provided on both sides of said first light-receiving element, an integrator for integrating an output of said first light receiving element, and a converter for converting a result of integration by said integrator;

wherein said integrator is reset when a light beam has passed over said second light receiving element, and at the same time starts integration; and wherein said converter converts the result of the integration when the light beam has passed over said third light-receiving element.

9. A light beam power controlling method comprising the steps of:

generating a plurality of light beams from a plurality of light sources;

optically combining the light beams;

reflecting the combined light beams toward a surface to be scanned with a polygonal mirror, and causing the light beams to be scanned over the surface in a main scanning direction;

sensing power of the light beams reflected by said polygon mirror on the surface with a beam power sensor, that includes a first light-receiving element, a second and third light-receiving elements respectively provided on both sides of said first light-receiving elements;

controlling the power of the light beams based on a result of sensing by said beam power sensor in said sensing step;

integrating an output of said first light receiving element with an integrator;

converting a result of said integration;

resetting said integrator when a light beam has passed over said second light receiving element, and starting integration at a same time; and converting the result of the integration when the light beam has passed over said third light-receiving element.

10. A light beam power controlling method according to claim 9, further comprising the steps of:

sensing passing positions of the light beams scanned over the surface in a sub-scanning direction perpendicular to the main scanning direction; and controlling the light beams scanned over the surface such that relative positions of the light beams on the surface are made proper on a basis of a result of sensing the passing positions after the power of each of the light beams is controlled in said light beam power controlling step.

11. A light beam scanning apparatus comprising:

a plurality of light sources to generate light beams;

a plurality of beam combining units, provided to said light sources, respectively, to optically combine the beams;

a single scanning unit to reflect the combined light beams toward a surface to be scanned, and to cause the light beams to be scanned over the surface in a main scanning direction;

a light beam power sensor, over which the light beams reflected from said single scanning unit are to be scanned, to sense power of the light beams on the surface;

a light beam power controller for controlling said light sources on the basis of a result of sensing by said light beam power sensor, so that each of the light beams scanned over the surface has power of a predetermined value;

a light beam position sensor, disposed in a sub-scanning direction perpendicular to the main scanning direction, to sense passing positions of the light beams caused by said scanning unit to be scanned over the surface, in the sub-scanning direction, wherein said light beam position sensor performs sensing over a scanning line in the same position in the sub-scanning direction as that when said light beam power sensor performs sensing; and a light beam passing position controller to control the light beams caused by said scanning unit to be scanned over the surface on the basis of a result of sensing by said light beam position sensor, so that passing positions of the light beams on the surface are made proper.

12. A light beam scanning apparatus according to claim 11, wherein power control of said power controller and position control of said light beam passing position controller are performed immediately after power is supplied to said apparatus, and also performed at regular intervals.

13. A light beam scanning apparatus according to claim 11, wherein the predetermined value of the power of said each of the light beams is a value at which a signal indicating beam power is prevented from being saturated in said light beam power sensor and a dynamic range of said light beam position sensor is nearly the largest.

14. A light beam scanning apparatus according to claim 11, wherein the light beam passing position controller controls a passing position of each of the light beams after power of said each light beam is controlled by said beam power controller.

15. A light beam scanning apparatus according to claim 11, wherein:

said light beam position sensor includes a first light beam position sensor that includes light-receiving elements arranged linearly at intervals corresponding to a first resolution in a sub-scanning direction perpendicular to the main scanning direction to sense positions through which the light beams caused by said scanning unit to be scanned over the surface pass in the sub-scanning direction; and a second light beam position sensor that includes light-receiving elements arranged linearly at intervals corresponding to a second resolution different from the first resolution in the sub-scanning direction, to sense positions through which the light beams caused by said scanning unit to be scanned over the surface pass in the sub-scanning direction, and wherein said light beam passing position controller controls each of the light beams caused by said scanning unit to be scanned over the surface on a basis of an associated one of results of sensing by said first and second light beam position sensors, so that said each of the light beams passes through a proper position in accordance with an associated one of the first and second resolution.

16. A light beam scanning apparatus, comprising:

a plurality of light sources to generate light beams;

a plurality of beam combining units, provided to said light sources, respectively, to optically combine the beams;

a single scanning unit to reflect the combined light beams toward a surface to be scanned, and to cause the light beams to be scanned over the surface in a main scanning direction;

a light beam power sensor to sense power of the light beams reflected from said single scanning unit that are scanned on the surface;

a light beam power controller for controlling the plurality of light sources on the basis of a result of sensing by the light beam power sensor, so that each of the light beams scanned over the surface has power of a predetermined value;

a light beam position sensor, disposed in a sub-scanning direction perpendicular to the main scanning direction, to sense passing positions of the light beams caused by said scanning unit to be scanned over the surface, in the sub-scanning direction, wherein the light beam position sensor includes first, second, and third beam position sensors, wherein the third beam position sensor is disposed between the first and second beam position sensors in the sub-scanning direction and has a length along the sub-scanning direction smaller than a length of the first and second position sensors in the sub-scanning direction, and wherein the light beam power sensor and the light beam position sensor are formed on a single body; and a light beam passing position controller to control the light beams caused by said scanning unit to be scanned over the surface on the basis of a result of sensing by said light beam position sensor, so that passing positions of the light beams on the surface are made proper.

* * * * *